(12) United States Patent
Maekawa et al.

(10) Patent No.: US 8,244,581 B2
(45) Date of Patent: Aug. 14, 2012

(54) DATA PROCESSING SYSTEM AND DATA PROCESSING METHOD

(75) Inventors: Takuji Maekawa, Kanagawa (JP); Yasuyuki Hattori, Tokyo (JP); Masaki Takemura, Tokyo (JP); Takahisa Hakoishi, Kanagawa (JP); Takashi Hosoda, Kanagawa (JP); Akira Yaegashi, Kanagawa (JP); Hiroshi Sugaya, Tokyo (JP)

(73) Assignee: Sony Corporation, Tokyo (JP)

( * ) Notice: Subject to any disclaimer, the term of this patent is extended or adjusted under 35 U.S.C. 154(b) by 1044 days.

(21) Appl. No.: 11/912,593

(22) PCT Filed: Apr. 25, 2006

(86) PCT No.: PCT/JP2006/308655
§ 371 (c)(1),
(2), (4) Date: Feb. 11, 2008

(87) PCT Pub. No.: WO2006/118112
PCT Pub. Date: Nov. 9, 2006

(65) Prior Publication Data
US 2009/0083149 A1 Mar. 26, 2009

(30) Foreign Application Priority Data

Apr. 27, 2005 (JP) .............................. P2005-130241
Mar. 31, 2006 (JP) .............................. P2006-100710

(51) Int. Cl.
*G06Q 40/00* (2012.01)
(52) U.S. Cl. ................. 705/14.4; 705/14.41; 705/14.43; 705/14.49; 705/14.72
(58) Field of Classification Search .................... 705/14, 705/14.4, 14.41, 14.49, 14.72
See application file for complete search history.

(56) References Cited

U.S. PATENT DOCUMENTS

| 2002/0143630 | A1* | 10/2002 | Steinman et al. | 705/14 |
| 2003/0036979 | A1* | 2/2003 | Tokorotani | 705/27 |
| 2003/0078839 | A1* | 4/2003 | Kumomura et al. | 705/14 |

(Continued)

FOREIGN PATENT DOCUMENTS

JP 10-240205 9/1998

(Continued)

OTHER PUBLICATIONS

U.S. Appl. No. 11/993,554, filed Dec. 21, 2007, Hattori, et al.

(Continued)

*Primary Examiner* — Jagdish Patel
*Assistant Examiner* — Kevin Poe
(74) *Attorney, Agent, or Firm* — Oblon, Spivak, McClelland, Maier & Neustadt, L.L.P.

(57) ABSTRACT

A data processing system includes a distributing device that distributes edited advertisement data and display terminal devices that display the edited advertisement data distributed to a first place in a predetermined territory. The display terminal devices are each provided with a first reader/writer configured to read out from and/or write in an IC card having stored memory identification data. The data processing system also includes a second reader/writer configured to read out from and/or write in an IC card. The data processing system also includes a hysteresis management device that manages hysteresis data HD1, HD2 from the first reader/writer, correlated with the memory identification data, and hysteresis data HD1 from the second reader/writer, correlated with the memory identification data. The data processing system further includes a hysteresis analysis device that correlates the hysteresis data HD1, HD2 for each of the memory identification data to generate analysis data.

3 Claims, 33 Drawing Sheets

U.S. PATENT DOCUMENTS

| | | | |
|---|---|---|---|
| 2005/0108164 A1* | 5/2005 | Salafia et al. | 705/42 |
| 2007/0022053 A1* | 1/2007 | Waserstein et al. | 705/42 |
| 2007/0150452 A1 | 6/2007 | Tsurumaki et al. | |
| 2008/0013916 A1* | 1/2008 | Sharpe et al. | 386/52 |
| 2009/0287594 A1* | 11/2009 | Updike | 705/35 |
| 2011/0089230 A1* | 4/2011 | Artino et al. | 235/379 |

FOREIGN PATENT DOCUMENTS

| | | |
|---|---|---|
| JP | 2001-34212 | 2/2001 |
| JP | 2001-134225 | 5/2001 |
| JP | 2002-298025 | 10/2002 |
| JP | 2002-366819 | 12/2002 |
| JP | 2003-85431 | 3/2003 |
| JP | 2003-271645 | 9/2003 |
| JP | 2003-271647 | 9/2003 |
| JP | 2004-110235 | 4/2004 |
| JP | 2004-171143 | 6/2004 |
| JP | 2005-37563 | 2/2005 |
| JP | 2005-513615 | 5/2005 |
| WO | WO 03/052608 A1 | 6/2003 |

OTHER PUBLICATIONS

U.S. Appl. No. 11/993,125, filed Dec. 19, 2007, Maekawa, et al.

U.S. Appl. No. 11/917,786, filed Dec. 17, 2007, Hattori, et al.

Japanese Office Action issued May 10, 2011, in Patent Application No. 2006-100712.

Office Action issued Nov. 8, 2011, in Japanese Patent Application No. 2006-100710 filed Mar. 31, 2006 (w/ English Translation).

Office Action issued Jan. 24, 2012, in Japanese Patent Application No. 2006-100710 filed Mar. 31, 2006.

* cited by examiner

FIG. 7A

Data from first reader/writer of display terminal device

| Memory identification data MID | first hysteresis data HD1 | Membership identification data MD | Second hysteresis data HD2 |
|---|---|---|---|
| 0001 | AAA | H0001 | XXX |
| 0003 | BBB | H0002 | YYY |
| 0006 | CCC | H0003 | ZZZ |
| 0009 | DDD | H0004 | XYZ |
| ... | ... | ... | ... |

FIG. 7B

Data from IC card management device

| Memory identification data MID | First hysteresis data HD1 |
|---|---|
| 0002 | EEE |
| 0003 | FFF |
| 0004 | GGG |
| 0009 | HHH |
| ... | ... |

FIG. 7C

Analysis data D

| Memory identification data MID | Membership identification data MD | First hysteresis data HD1 | Second hysteresis data HD2 |
|---|---|---|---|
| 0003 | H0002 | BBB | YYY |
|  |  | FFF |  |
| 0009 | H0004 | DDD | XYZ |
|  |  | HHH |  |
| ... |  | ... |  |

FIG.15A

| Advertisement data | Advertisement display hysteresis | | |
|---|---|---|---|
| | Start time | End time | Cycle |
| ad40384 | 13:15:00 | 13:30:00 | 5 |
| ad42783 | 13:30:00 | 13:40:00 | 10 |
| ad43211 | 13:40:00 | 13:59:30 | 4 |
| ad42307 | 13:59:30 | 14:00:00 | 1 |
| ad40388 | 14:00:00 | 14:15:30 | 15 |
| | 14:15:30 | 14:30:00 | |
| ad46827 | 14:30:00 | 14:30:30 | 1 |

FIG.15B

| Advertisement data | Coupon ID | Advertisement display hysteresis | | | Operation hysteresis | Coupon acquisition hysteresis | | | Purchase hysteresis | |
|---|---|---|---|---|---|---|---|---|---|---|
| | | Start time | End time | Cycle | Panel touch | MID_01 | MID_02 | MID_03 | MID_11 | MID_12 |
| ad40384 | 4abei39 | 13:15:00 | 13:30:00 | 5 | 3 | 448320**** | 234732**** | | | |
| ad42783 | 58deic3 | 13:30:00 | 13:40:00 | 10 | 12 | 004812**** | 564828**** | 643200**** | | |
| ad43211 | 46gvbcjl | 13:40:00 | 13:59:30 | 4 | 0 | | | | | |
| ad42307 | | 13:59:30 | 14:00:00 | 1 | 0 | | | | | |
| ad40388 | | 14:00:00 | 14:15:30 | 15 | 1 | | | | 384601**** | |
| | | 14:15:30 | 14:30:00 | | | | | | | |
| ad46827 | dei3288 | 14:30:00 | 14:30:30 | 1 | 0 | | | | | |
| ze47299 | 7yg8q83 | 14:30:30 | 14:31:30 | 4 | 1 | | | | | |
| de2e334 | | 14:31:30 | 14:33:30 | 8 | 2 | | | | | |
| cw00398 | ue98223 | 14:59:30 | 15:00:00 | 1 | 1 | 934145**** | | | | |
| rt347288 | | 15:00:00 | 15:00:30 | 1 | 0 | | | | | |

| MID | Date/time | Used coupon ID | Value data hysteresis | |
|---|---|---|---|---|
| | | | Subtracted value | Balance |
| 448320***** | 2006/10/30 13:20:34 | 4abei39 | 500 | 2874 |
| 564828***** | 2006/10/30 13:33:01 | 58deic3 | 234 | 8765 |
| 643200***** | 2006/10/30 13:35:33 | 568dhji | 3475 | 3492 |
| 658232***** | 2006/10/30 13:45:19 | 58deic3 79f3adc ji49203 | 280 | 3475 |
| 934145***** | 2006/10/30 13:48:20 | ue98223 | 964 | 2223 |

FIG.16

```
<playlist>
<timestamp date="2006-02-28 20:45:24" />
<scene start="2006-03-01 09:13:30" end="2006-03-01 09:14:00">
<content>
http://aaa.co.jp/contents/content1
</content>
<scene start="2006-03-01 09:14:00" end="2006-03-01 09:14:30">
<content>
http://bbb.co.jp/contents/content2
</content>
<scene start="2006-03-01 09:15:00" end="2006-03-01 09:15:30">
<content>
http://ccc.co.jp/contents/content3
</content>
</playlist>
```

FIG.21

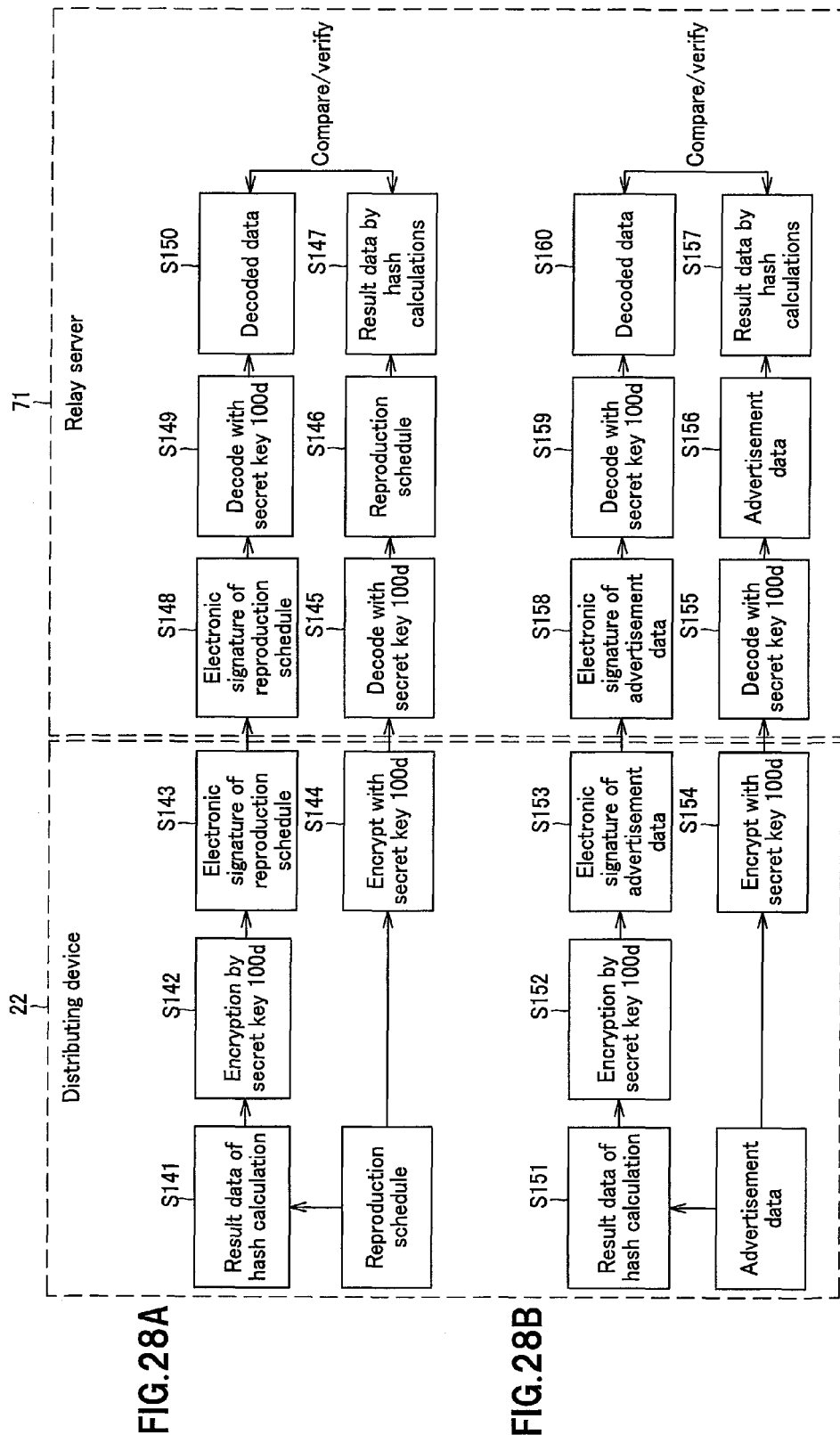

| | System manager S | | Advertisers A~C | | Sites installed L,S,CS |
|---|---|---|---|---|---|
| | System management terminal device 62/ editing device 21 | | First to third advertisement input units 10a~10c | Advertisement data reproduction schedule management staff | Management terminal device 81 |
| | System manager | Advertisement data reproduction schedule approver | | | Each installed site owner |
| Reproduction schedule editing | O | O | △ | △ | △ |
| Advertisement data registration | O | × | △ | △ | △ |
| Pre-browsing of advertisement data | O | O | △ | △ | △ |
| Browsing of hysteresis data | O | × | △ | △ | △ |
| Coupon circulation tracing | O | × | △ | × | △ |
| Management of display terminal device 32 (e.g. power supply) | × | × | × | × | △ |

FIG.31

| Start time | End time | Cycle | Movie File | Text File | *** File | Coupon File | Client | Agent | Category |
|---|---|---|---|---|---|---|---|---|---|
| .. | .. | .. | .. | .. | .. | .. | .. | .. | .. |
| .. | .. | .. | .. | .. | .. | .. | .. | .. | .. |
| .. | .. | .. | .. | .. | .. | .. | .. | .. | .. |
| 13:15:00 | 13:30:00 | 5 | ***.mpg | *.txt | *.* | ***.* | S | K | Electronics |
| 13:30:00 | 13:40:00 | 10 | ***.mpg | | *.* | ***.* | C | Q | Bevarage |
| 13:40:00 | 13:59:30 | 4 | | | ***.* | | P | Q | DentalCare |
| 13:59:30 | 14:00:00 | 1 | | | default001.*** | | | | System Idle |
| 14:00:00 | 14:15:30 | 15 | ***.mpg | *.txt | *.* | | | | Local |
| 14:15:30 | 14:30:00 | | Void frame | | | | | | |
| 14:30:00 | 14:30:30 | 1 | ***.mpg | *.txt | *.* | ***.* | U | P | Local |
| 14:30:30 | 14:31:30 | 4 | | ***.txt | *.* | ***.* | U | C | Local |
| 14:31:30 | 14:33:30 | 8 | ***.mpg | | *.* | | U | C | Local |
| 14:59:30 | 15:00:30 | 1 | ***.mpg | *.txt | default001.* | | | | System Idle |
| 15:00:00 | 15:00:30 | 1 | ***.mpg | *.txt | *.* | ***.* | S | K | Computer |
| .. | .. | .. | .. | .. | .. | .. | .. | .. | .. |
| .. | .. | .. | .. | .. | .. | .. | .. | .. | .. |
| .. | .. | .. | .. | .. | .. | .. | .. | .. | .. |

FIG.32

| Start time | End time | Cycle | Movie File | Text File | *** File | Coupon File | Client | Agent | Category |
|---|---|---|---|---|---|---|---|---|---|
| .. | .. | .. | .. | .. | .. | .. | .. | .. | .. |
| .. | .. | .. | .. | .. | .. | .. | .. | .. | .. |
| .. | .. | .. | .. | .. | .. | .. | .. | .. | .. |
| 13:30:00 | 13:40:00 | 10 | **.mpg | | *.* | *.*** | C | Q | Bevarage |
| 13:40:00 | 13:59:30 | 4 | | | *.* | | P | Q | DentalCare |
| 14:15:30 | 14:30:00 | | | | | | | | |
| | | | | | | | | | |
| | | | | | | | | | |
| | | | | | | | | | |
| | | | | | | | | | |
| | | | | | | | | | |
| .. | .. | .. | .. | .. | .. | .. | .. | .. | .. |
| .. | .. | .. | .. | .. | .. | .. | .. | .. | .. |
| .. | .. | .. | .. | .. | .. | .. | .. | .. | .. |

FIG.33

DATA PROCESSING SYSTEM AND DATA PROCESSING METHOD

TECHNICAL FIELD

This invention relates to a system and a method for data processing in which owner's use hysteresis data are collected using a memory e.g. of an IC card.

The present application claims priority rights based on the Japanese Patent Application No. 2005-130241 filed in Japan on Apr. 27, 2005, and on the Japanese Patent Application No. 2006-100710 filed in Japan on Mar. 31, 2006. These applications are to be incorporated by reference in the present application.

BACKGROUND ART

Among IC cards, each having an on-board memory, there are those in the memories of which are stored amount data as value data. For such IC card, update processing is carried out by a reader/writer when a user purchases goods at a store. This update processing subtracts amount data corresponding to the price of the goods purchased and records purchase hysteresis data in the memory, by way of update processing.

In a railroad station, a square or a lobby visited by many people, display apparatus for advertisement and merchandising are frequently installed. This display apparatus displays advertisement data, prepared by e.g. an advertisement agency, as moving pictures or as still images.

DISCLOSURE OF THE INVENTION

Problems to be Solved by the Invention

The advertisement, displayed by the display apparatus, is furnished uni-directionally to the viewer, so that, even if the viewer desires to know details of given goods, thus advertised, he/she is unable to know them instantly. On the other hand, an advertiser is not in a position to confirm the effect of the advertisement which has been made with the use of the display apparatus installed at a preset place. In particular, the advertiser is unable to grasp the effect of advertisement in relation with the preset place where the display apparatus is installed.

The Japanese Laid-Open Patent Publication 2002-298025, referred to below as Patent Publication 1, discloses a system in which a coupon is issued in a terminal unit of an advertisement furnishing store, and is recorded in an IC card, the information on the using state of the coupons in the store is recorded in a management unit, and the advertisement fee is calculated in keeping with the using state information. It is however not possible with the system of the Patent Publication 1 to keep track of the goods purchasing hysteresis, indicating what goods has been purchased by the IC card user, or the behavior hysteresis, indicating what store has been called at by the IC card user.

The present invention has been accomplished taking the above problems in mind. It is an object of the present invention to provide a data processing system and a data processing method in which hysteresis such as user's purchase hysteresis of e.g. goods may be known from a memory carried about by a user, such as a consumer.

It is more specific object of the present invention to provide a data processing system and a data processing method in which the user's purchase hysteresis of e.g. goods may be known in relation with the particular place of advertisement.

It is another object of the present invention to provide a data processing system and a data processing method in which coupons such as discount data are issued to promote their use by the user.

A data processing system according to the present invention comprises editing means for editing a plurality of advertisement data to generate edited advertisement data for distribution, and distribution means for distributing the edited advertisement data edited by the editing means over a network. The system according to the present invention also includes display means for displaying the distributed edited advertisement data in a first place. The display means includes first readout/write means for reading out from and writing in a memory having at least memory identification data stored therein. The system according to the present invention also includes second readout/write means installed in a second place different from the first place to read out from and/or write in the memory, and management means for managing hysteresis data from the first readout/write means, correlated with the memory identification data, and hysteresis data from the second readout/write means, correlated with the memory identification data. The system according to the present invention further includes analysis means for correlating, for each of the memory identification data, the hysteresis data from the first readout/write means and the hysteresis data from the second readout/write means, and for generating analysis data.

A data processing method according to the present invention includes a step of editing a plurality of advertisement data to generate edited advertisement data for distribution by editing means, and a step of distributing the edited advertisement data edited by the editing means by distributing means over a network. The method according to the present invention also includes a step of displaying the distributed edited advertisement data by display means installed in a first place, and a step of reading out edited advertisement data stored in a memory by first readout/write means installed in the display means. The method according to the present invention also includes a step of reading out memory identification data stored in the memory, by second readout/write means installed in a second place different from the first place, and a step of managing hysteresis data from the first readout/write means, correlated with the memory identification data, and hysteresis data from the second readout/write means, correlated with the memory identification data, by management means. The method according to the present invention further includes a step of correlating, for each of the memory identification data, the hysteresis data from the first readout/write means and the hysteresis data from the second readout/write means, and for generating analysis data, by analysis means.

According to the present invention, described above, the hysteresis data from the first readout/write means and hysteresis data from the second readout/write means are correlated with each other, for each of memory identification data allocated to the memories, to generate analysis data, whereby it becomes possible to know the memory use hysteresis, that is, the behavior hysteresis, of the owners of the memories in a preset range centered about the first site.

If the advertiser-based advertisement data is to be distributed, the editing means for editing the plural advertisement data to generate the edited advertisement data for distribution may be dispensed with.

Meanwhile, the advertisement data, displayed on the display means, are distributed over a network from a distribution server operating as distribution means. Hence, if requests for acquiring the advertisement data from many display means are concentrated on the distribution means, it becomes impossible to distribute the advertisement data in time due to increased load on the distribution server distributing the advertisement data.

The present invention also provides a distribution system for reducing the load on the distribution server distributing the advertisement data to enable the advertisement data to be distributed in time to the display devices, a distribution server used for this system, a relay server, and a data processing method for these devices.

That is, the present invention also resides in a system for distributing advertisement data to the display terminal devices from the distribution server via a relay server, a distribution server constituting this distribution system, a relay server, and a data processing method for these devices.

The relay server receives status notifications of the display terminal devices from the display terminal devices and, on receipt of the status notifications, transmits the tenor of receipt of the status notifications to the display terminal devices.

The distribution server receives status notifications including the status of the display terminal devices from the relay server and, on receipt of the status notifications, transmits the tenor of receipt of the status notifications to the relay server.

In case the distribution server has determined that the reproduction schedule of the advertisement data has been changed, it transmits a notification on the change of the reproduction schedule, along with the tenor of receipt of the status notification, to the relay server.

If, after transmitting the notification on the change of the reproduction schedule, the distribution server has received a request for acquisition of the as-changed reproduction schedule, from the relay server, the distribution server sends the as-changed reproduction schedule to the relay server.

If the relay server has determined that the reproduction schedule acquired from the distribution server has been changed, the relay server transmits the notification on the change of the reproduction schedule, along with the tenor of receipt of the status notification, to the display terminal device.

If, after sending the notification on the change, the relay server has received a request for acquisition of the as-changed reproduction schedule, it sends the as-changed reproduction schedule to the display terminal device.

According to the present invention, described above, notifications on the change of the reproduction schedule are exchanged between the distribution server and the relay server and between the relay server and the display terminal devices, in the periodic status check, thus reducing the communication load on a source of the transmission of the reproduction schedule. The statuses of the display terminal devices may also be reported via relay server to the distribution server.

The distribution server may verify whether or not the communication load is greater than a preset value and, in case the communication load is smaller than the preset value, the distribution server may transmit the as-changed reproduction schedule to the relay server. The relay server may also verify whether or not the communication load is greater than a preset value and, in case the communication load is smaller than the preset value, the relay server may transmit the as-changed reproduction schedule to the display terminal device.

The present invention also provides a further relay server that reduces the load on the distribution server distributing the advertisement data to enable the advertisement data to be distributed in time to the display device, and a data processing method for the device.

That is, the relay server according to the present invention, distributing advertisement data from a distributing device over a first network, to a plural number of display terminal devices, connected over a second network to the relay server, includes first communication means, communicating with the distribution device, second communication means, communicating with the display terminal devices, advertisement storage means, reproduction schedule storage means and schedule generating means. The advertisement storage means causes the advertisement data, received by the first communication means, to be stored therein. The reproduction schedule storage means stores the reproduction schedule in the display terminal devices of the advertisement data, received by the first communication means and stored in the storage means. The schedule generating means generates a download schedule for downloading the advertisement data from the distributing device via the first communication means, beginning from the advertisement data reproduced soonest in accordance with the reproduction schedule.

A data processing method according to the present invention is a data processing method for a relay server distributing advertisement data, distributed from a distribution device over a first network, to a plural number of display terminal devices connected to the relay server over a second network. The method includes a step of receiving the reproduction schedule for advertisement data in the display terminal devices transmitted from the distribution device, and a step of generating a download schedule downloading the advertisement data from the distributing device in accordance with the reproduction schedule received. The method also includes a step of downloading and saving the advertisement data in storage means in accordance with the download schedule and a step of transmitting the advertisement data of the storage means to the display terminal devices in accordance with the reproduction schedule.

In the present invention, described above, the download schedule for downloading the advertisement data from the distributing device in accordance with the reproduction schedule for the advertisement data in the display terminal devices, transmitted from the distributing device, is generated, and the advertisement data is downloaded in accordance with the download schedule. It is therefore possible to prevent the access for downloading the advertisement data from being concentrated in the distribution device to enable the communication load on the distribution device from being reduced. The relay server therefore is able to store the advertisement data reproduced in the display terminal devices for all time to prevent the delay in reproduction of the advertisement data in the display terminal devices.

BRIEF DESCRIPTION OF THE DRAWINGS

FIG. 5(A) shows a recording area of a first IC card exclusively used for electronic money and FIG. 5(B) shows recording areas of a multi-purpose second IC card, such as a hotel membership card.

FIGS. 7(A) to 7(C) are diagrammatic views showing various data, where FIG. 7(A) shows memory identification data MID from a first reader/writer of a display terminal unit provided in the hotel, FIG. 7(B) shows memory identification data and first hysteresis data HD1, membership identification data MD and second hysteresis data HD2 from a second reader/writer of a store terminal device installed in a store A handling the IC card, and FIG. 7(C) shows analysis data generated from the data of FIGS. 7(A) and 7(B).

FIGS. 15(A) and (B) are diagrammatic views showing the hysteresis in case the display terminal unit is constituted by a large picture image terminal and a small picture image terminal, where FIG. 15(A) shows the hysteresis of the large picture image terminal and FIG. 15(B) shows the hysteresis of the small picture image terminal.

FIG. 16 is a diagrammatic view showing the hysteresis of purchasing of goods.

FIG. 20(A) shows the constitution of advertisement data not containing coupons and FIG. 20(B) shows the constitution of advertisement data containing the coupons FIG. 21 is a schematic view showing a reproduction list.

FIG. 27(A) shows the constitution of an authentication unit and FIG. 27(B) shows the sequence of the processing for authentication.

FIGS. 28(A) and 28(B) are block diagrams showing the SSL between the distribution unit and the relay server, where FIG. 28(A) shows the processing for transmitting the reproducing schedule and FIG. 28(B) shows the processing for transmitting the advertisement data.

FIG. 31 is a diagrammatic view showing the competence of each of units making up the system shown in FIG. 18.

FIG. 32 is a diagrammatic view showing data that may be accessed in case of login by a system manager to the system management terminal unit or an editing unit.

FIG. 33 is a diagrammatic view showing data that may be accessed by an advertisement input unit.

BEST MODE FOR CARRYING OUT THE INVENTION

The data processing system and method according to the present invention will now be described with reference to the drawings.

Figure 1:
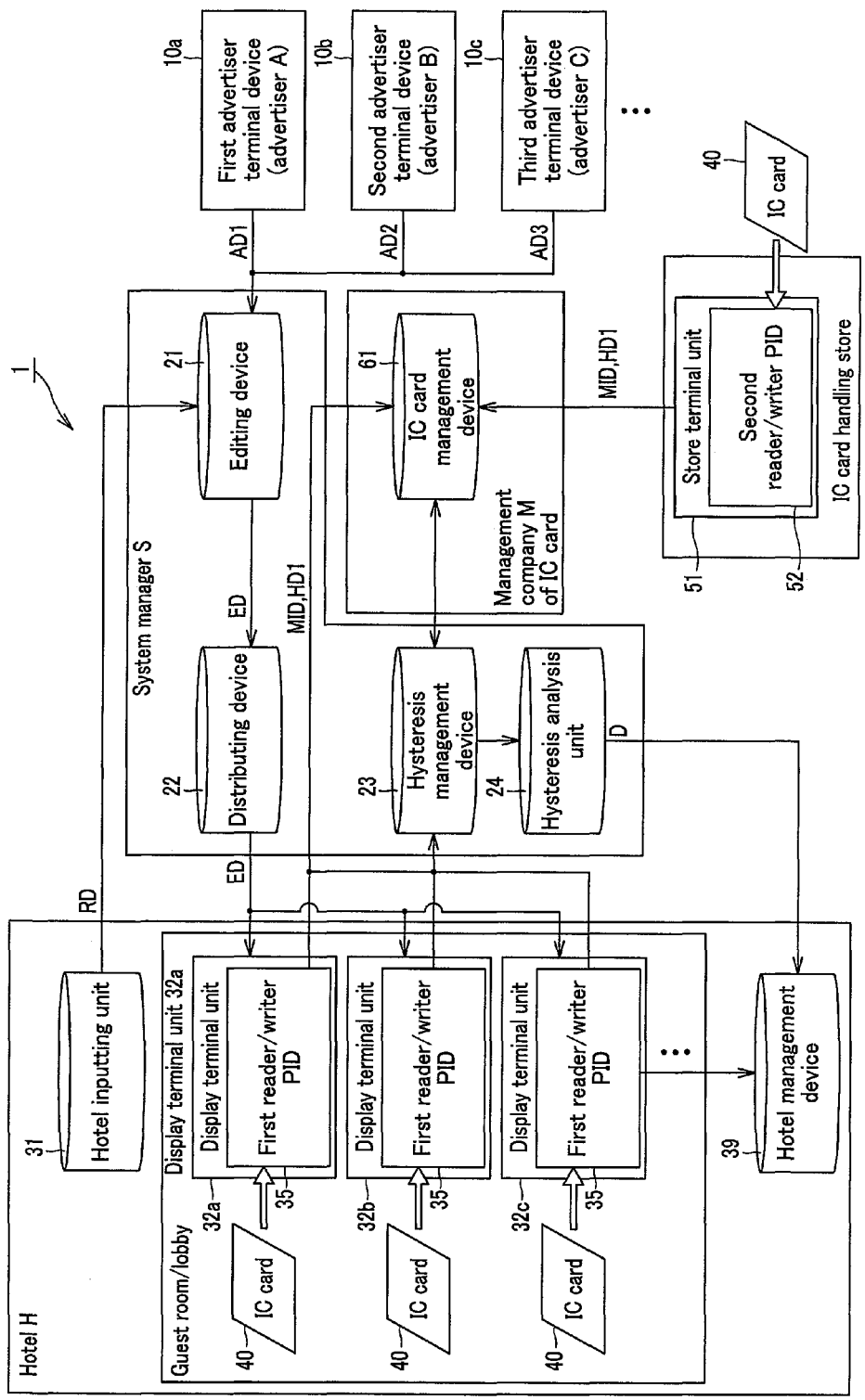
FIG. 1 is a schematic view showing the constitution of a data processing system according to the present invention.

Referring to FIG. 1, a data processing system 1 according to the present invention includes first to third advertisement input units 10a to 10c, as terminal devices supervised by advertisers A, B, C and so forth.

The advertiser A is e.g. a leading advertisement agency, and generates first advertisement data AD1 of a specified organization and/or specified goods, in a first advertisement unit 10a. The advertiser A inputs, as the conditions for distributing the advertisement data, the display time, such as 15 seconds or 30 seconds, time zones, number of loops or display time durations, to the first advertisement unit 10a.

The advertiser B is an advertiser within a predetermined territory and may, for example, be a ticket sale agent for an area within 500 m around a hotel H. The advertiser B generates, by the second advertisement unit 10b, second advertisement data AD2, which may be advertisement data or coupon data for a specified motion picture.

The advertiser C is a restaurant within a predetermined territory, for example, within 500 m around the hotel H. The advertiser C generates third advertisement data AD3, made up of, for example, advertisement data and coupon data of a specified store, by the third advertisement unit 10c.

The first to third advertisement input units 10a to 10c are each of a constitution similar to that of a routine computer, and includes a hard disc, a ROM (Read Only memory), a RAM (Random Access Memory), a CPU (Central Processing Unit), a display, such as an LCD (Liquid Crystal Display) or a CRT (Cathode Ray Tube), an inputting device, such as a keyboard or a mouse, an input/output interface, referred to below simply as an interface, for an external storage device, such as an optical disc, and a communication I/F for communication via a network, such as the Internet. The first to third advertisement input units 10a to 10c generate first to third advertisement data AD1 to AD3 by e.g. editing softwares installed therein. The first to third advertisement data may, for example, be made up of moving picture data, still picture data, audio data or text data.

It should be noted that the number of the advertisers or that of the advertisement input devices is not limited to three as in the above-described case.

The data processing system 1 also includes an editing device 21 and a distributing device 22, as devices supervised by the system manager S. The editing device 21 edits the first to third advertisement data AD1 to AD3, furnished from the first to third advertisement input units 10*a* to 10*c* of the advertisers A to C, respectively. The distributing device 22 distributes the edited advertisement data.

The editing device 21 has the constitution similar to that of the routine computer, and includes a hard disc, a ROM, a RAM, a CPU, a display unit, such as an LCD or a CRT, an input device, such as a keyboard or a mouse, an input I/F for an external storage device, such as an optical disc, and a communication I/F for communication with the Internet.

The first to third advertisement data AD1 to AD3, furnished from the first to third advertisement input units 10*a* to 10*c* via the communication I/F or the input/output I/F, are supplied to the editing device 21, where the functions installed, such as the functions of the editing software, are executed to edit the input first to third advertisement data AD1 to AD3 to generate a sequence of edited advertisement data ED made up of moving pictures, still image data, audio data or text data.

Meanwhile, the first to third advertisement data AD1 to AD3 from the first to third advertisement input units 10*a* to 10*c* are input via a network, such as WAN (Wide Area network) to which the data processing system is attached via a public network. Hence, the first to third advertisement data AD1 to AD3 may be encrypted using a protocol of e.g. the HTTP (Hyper text Transfer protocol), such as SSL (Secure Sockets Layer), and input using a secure network.

Figure 2:
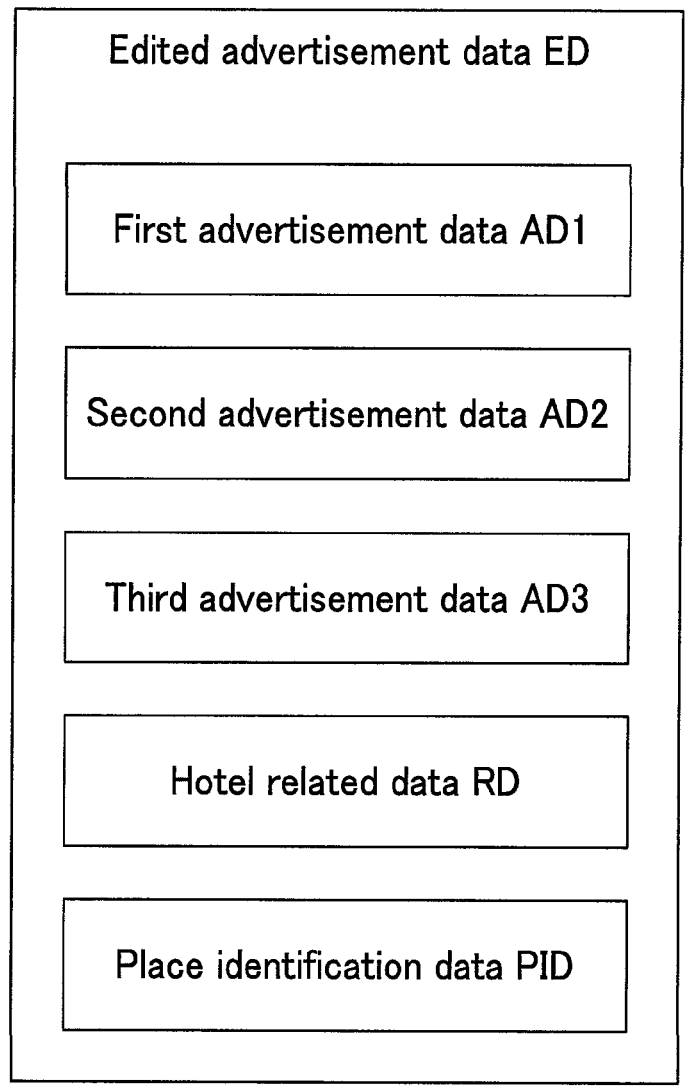
FIG. 2 is a schematic view showing the constitution of edit advertisement data.

The edited advertisement data ED, thus generated, includes first advertisement data AD1, generated by the first advertisement input device 10*a*, second advertisement data AD2, generated by the second advertisement input device 10*b*, and the third advertisement data AD1, generated by the third advertisement input device 10*c*, as shown in FIG. 2. The edited advertisement data ED is edited so that the first to third advertisement data AD1 to AD3 are displayed on the display screen in three separate parts, or so that one or more of the advertisement data are displayed superposed with the other advertisement data. Also, the advertisement data AD1 to AD3 are of a layered structure, such that, when one of the advertisement data is selected, detailed lower-layer advertisement data are simultaneously displayed.

Meanwhile, the edited advertisement data ED includes place identification data PID appended by the system manager S using the editing device 21. Here, the place identification data PID is the data specifying the place of the hotel H. In addition, the edited advertisement data ED includes related data RD furnished by the place of advertisement, furnished by a hotel input device 31, as later described. Here, the places of advertisement include the hotel H.

On generating the edited advertisement data ED, the editing device 21 transmits the so generated data to the distributing device 22 via wired or wireless network or via a mobile recording medium, such as an optical disc. Meanwhile, the data for networked transmission may be encrypted using e.g. the aforementioned SSL.

The distributing device 22 has a constitution similar to that of the routine server and includes e.g. a hard disc, a ROM, a RAM, a CPU, an input I/F for an external storage device, such as an optical disc, and a communication I/F for communication with a network, such as the Internet. The distributing device 22 distributes the edited advertisement data ED, generated by the editing device 21, to the hotel H via the network, such as the Internet, in accordance with preset conditions, such as designated date and time.

It should be noted that the distributing device 22 manages the place identification data PID, by a database provided on a hard disc, in association with address data on e.g. the network of display terminal devices 32*a* to 32*c* that are to be the destinations of distribution of the edited advertisement data ED as later described. The place identification data PID are allocated to the display terminal devices 32*a* to 32*c*. The distributing device 22 distributes the edited advertisement data ED to the display terminal devices 32*a* to 32*c* to which are allocated the same place identification data PID as the place identification data PID contained in the edited advertisement data ED.

In the above-described embodiment, a set of the edited advertisement data ED has been generated by the editing device 21 based on the first to third advertisement data AD1 to AD3. It is however possible for the editing device 21 to treat the first to third advertisement data AD1 to AD3 as individual data rather than as sequential data. That is, the individual first to third advertisement data AD1 to AD3 may be downloaded to a display terminal device 32 in accordance with the reproduction list having recorded address data indicating the location of the advertisement data or the reproducing time.

In addition, this data processing system 1 includes a hotel input device 31 and display terminal devices 32*a* to 32*c*, as devices to be managed by the hotel H. The hotel input device 31 generates e.g. hotel related data RD, to be contained in the edited advertisement data ED, and transmits the so generated data to the editing device 21 that is supervised by the system manager S. The display terminal devices 32*a* to 32*c* are installed in public spaces, such as lobby or each guest room of the hotel H.

The hotel input device 31 has a constitution similar to that of a routine computer, and includes e.g. a hard disc, a ROM, a RAM, a CPU, a display unit, such as an LCD or a CRT, input devices, such as a keyboard or a mouse, an input I/F for an external storage device, such as an optical disc, and a communication I/F for communication with a network, such as the Internet.

As the hotel related data RD, to be furnished to the users, such as hotel guests, the hotel H generates, by the hotel input device 31, the weather information, information on near-by facilities, traffic information, information on utensils equipped in guest rooms, or the advertisement information on trial pieces. The hotel H then transmits the so generated information via the network or the mobile recording medium to the editing device 21 that is supervised by the system manager S. These hotel related data RD are also included in the edited advertisement data ED in the course of the editing process by the editing device 21.

The edited advertisement data ED, distributed by the distributing device 22, are distributed to the display terminal devices 32*a* to 32*c* via a network, such as WAN, the distributing device is attached to via a public network. The edited advertisement data ED may be distributed to the display terminal devices 32*a* to 32*c* in safety by e.g. SSL.

Figure 3:
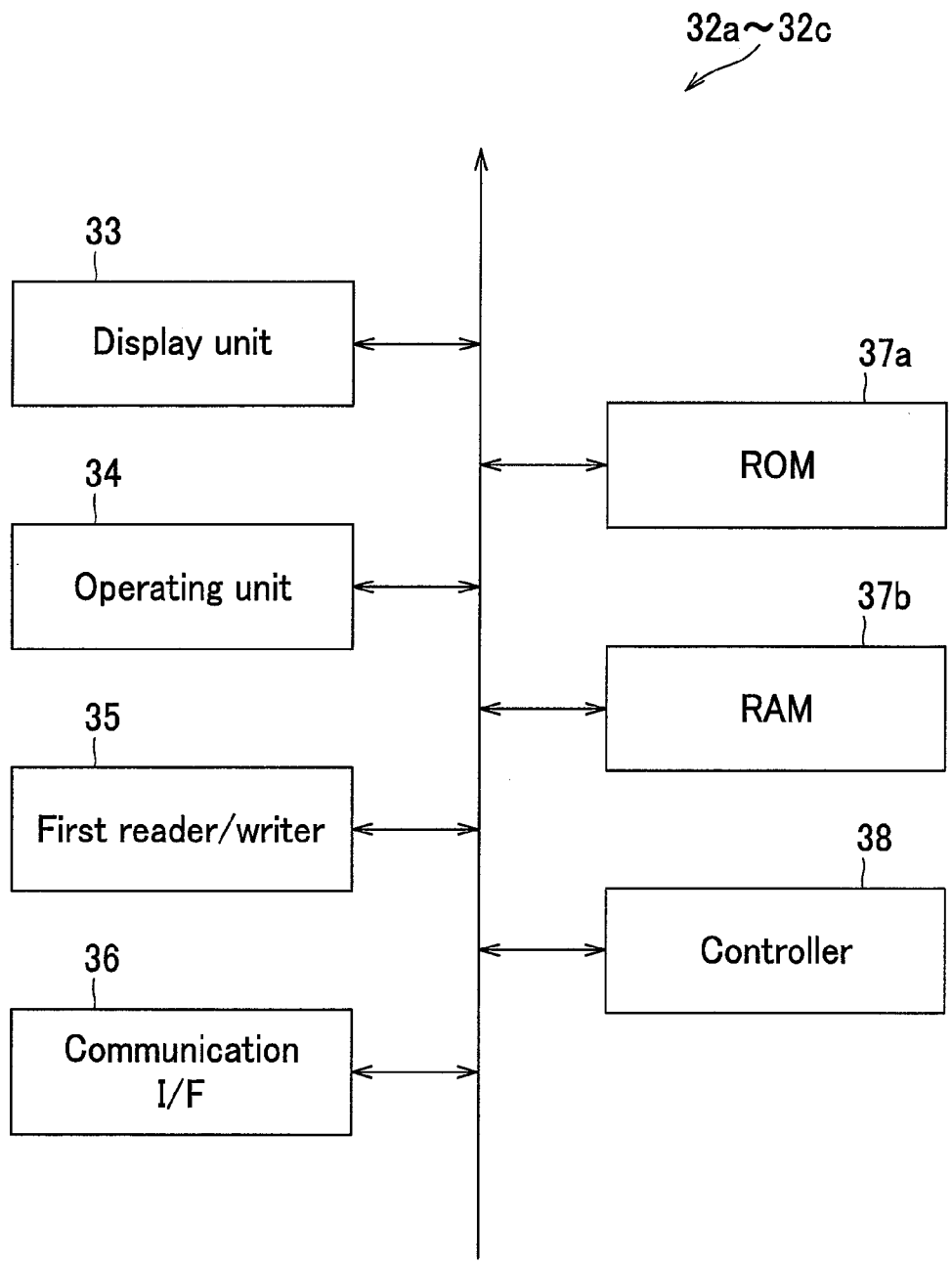
FIG. 3 is a block diagram showing a display terminal unit installed in a hotel.

Referring to FIG. 3, the display terminal devices 32*a* to 32*c* each include a display unit 33, an operating unit 34, a first reader/writer 35, a communication I/F 36, a ROM 37*a*, a RAM 37*b* and a controller 38. The display unit 33 is constituted by a touch panel 8 to 12 inches in size. The operating unit is constituted by a cross key or a plural number of pushbuttons. The first reader/writer is used to read out from or write in an IC card 40 owned by a user. The communication I/C communicates with the distributing device 22. The ROM 37 includes control programs, for example, stored therein, while the RAM 37*b* includes application programs, for example, stored therein. The controller executes calculations based on the control programs.

The place identification data PID for identification of the places where the display terminal devices 32*a* to 32*c* are installed are allocated to the display terminal devices 32a to 32c. The place identification data PID are stored in storage means, such as ROM 37a. The place identification data PID, allocated to the display terminal devices 32a to 32c, are not the identification data allocated to the individual display terminal devices 32a to 32c, but are identification data common to, for example, the totality of the display terminal devices 32a to 32c in the hotel H. That is, the place identification data PID denote the places where the display terminal devices 32a to 32c are installed, and identify the places of advertisement.

Meanwhile, identification data for specified places of installation in the hotel H, such as each guest room or a lobby, may be appended as branch numbers to the place identification data PID. In this case, a hotel server is installed between the distributing device 22 and the display terminal device 32. The place identification data PID is afforded to a hotel server operating as a proxy server that relays the editing advertising data ED, and a branch number is afforded to the display terminal device 32 attached to the server via LAN (Local Area Network) secured by e.g. SSL. The hotel related data RD, tailored to the hotel guests lodged in a preset guest room, are supplied to the hotel server. By so doing, the hotel related data RD is distributed from the hotel server to the display terminal device 32, without the hotel related data RD being supplied to the editing device 21. The edited advertisement data ED is provided in the hotel server, thus relieving the load of the distributing device 22.

The first reader/writer 35 communicates with an IC card 40 by short field or near field wireless communication, such as RFID (Radio Frequency Identification System) or NFC (Near Field Communication), and includes an antenna coil mounted on the display unit 33. In the following description, RFID is taken as an example for explanation. The antenna coil of the first reader/writer 35 is formed to be transparent so as to transmit light lest the antenna coil should prove to be obstructive to viewing the display screen. The display unit 33 may have only the display function. The first reader/writer 35 may be provided near the display unit 33 or on the back side of an enclosure. The display unit 33 may also be connected over a wired or wireless path to the display terminal devices 32a to 32c.

The edited advertisement data ED may be displayed on the display units 33 on the display terminal devices 32a to 32c. One of plural advertisement data displayed may also be selected and the detailed lower-layer advertisement data may then be displayed on the display units 33 on the display terminal devices 32a to 32c by acting on the display unit 33 or the operating unit 34. With the display terminal device 32a, 32b or 32c, a coupon data CD, included in each advertisement data of the edited advertisement data ED, may be downloaded or the goods advertised by the first to third advertisement data AD1 to AD3 may be purchased by putting the IC card 40 over the antenna coil of the first reader/writer 35. In case the antenna coil is provided on the display unit 33, such instruction as 'put an IC card over this part' is demonstrated on a part of the picture image configured for downloading the coupon data CD or on the picture image configured for purchasing the goods. When the IC card 40 is used, the display terminal device 32a, 32b or 32c generates access log data to save the so generated data in a hard disc or in a semiconductor memory. For example, the display terminal device 32a, 32b or 32c saves address data or time/date data of the page of the edited advertisement data ED accessed or log data of time and date of access to the IC card 40.

The places where the display terminal devices 32a to 32c are installed are first places in the hotel H where the IC card 40 is used or the advertisement is made.

Figure 4:
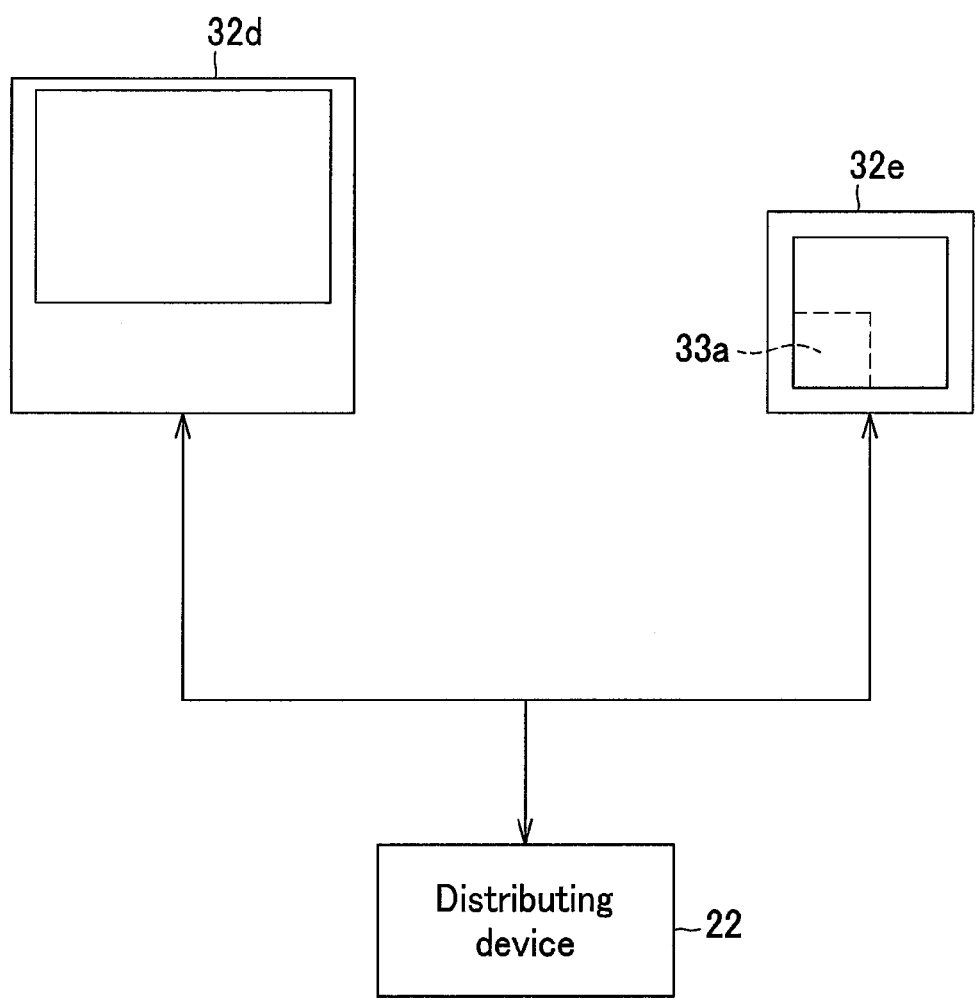
FIG. 4 is a schematic view showing both a large picture image display terminal unit and a small picture image display terminal unit installed in a hotel.

The number of the display terminal devices 32a to 32c, installed in the hotel H, is not limited to three. The display terminal devices with variable picture image sizes, for example, with large and small picture sizes, may be provided, as shown in FIG. 4. That is, a display terminal device 32d of a large picture image size, such as 50 or 60 inches or even larger, may be provided in a public space, such as in a lobby, for many people to view the advertisement data simultaneously, whilst a display terminal device 32e of a small picture image size, such as 20, 30 or 40 inches, may be provided in each guest room for each hotel guest to view the data personally, as shown in FIG. 4. The small-sized display terminal device 32e, placed in each guest room, may be configured as shown in FIG. 3. There are provided a first reader/writer 35 or a card area 33a inclusive of the antenna coil 33b shown in FIG. 11. This allows the hotel to acquire hysteresis data of guests lodged in the guest room. Although the first reader/writer 35 may be provided on the large picture image surface display terminal device 32d installed in a public place, it is not provided here and simply the push type advertisement is made for the general public. In such case, the large picture image surface display terminal device 32d is configured to store hysteresis data of the displayed advertisement data.

It should be noted that the antenna coil on the reader/writer is magnetically coupled to the antenna coil provided on the IC card 40, owned by the user, by magnetic induction, in accordance with this RFID, to allow non-contact data communication between the antenna coil on the side of the reader/writer and that on the side of the IC card 40. This IC card 40 includes an internal memory device, within which there are stored e.g. amount data, as value data, in association with identification data of the memory device.

Figure 5A:
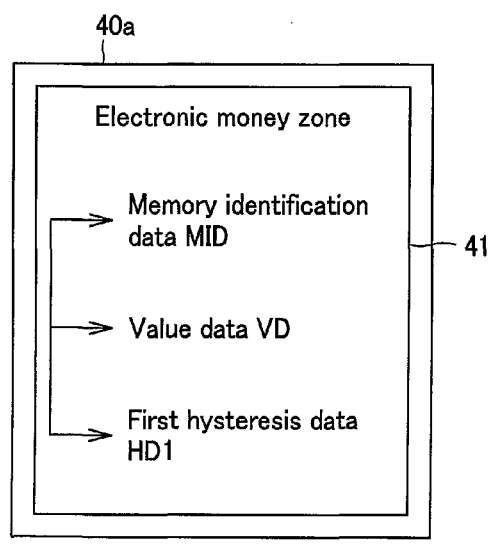
FIGS. 5(A) and 5(B) show recording areas of an IC card, where

The IC card 40 is e.g. of two types, namely a first IC card 40a and a second IC card 40b. The first IC card 40a includes an electronic money zone 41 in its memory device, as shown in FIG. 5(A). In this electronic money zone 41, there are stored memory identification data MID for identifying the memory device, value data VD, as monetary value data, and first hysteresis data HD1. The first hysteresis data HD1 includes time/date data for amount variations on payment and receipt, identification data of goods purchased, identification data of e.g. stores where the reader/writers are installed, identification data of goods purchased, and date/time data of access to the reader/writers. The value data VD and the first hysteresis data HD1 are associated with the memory identification data MID.

Figure 5B:
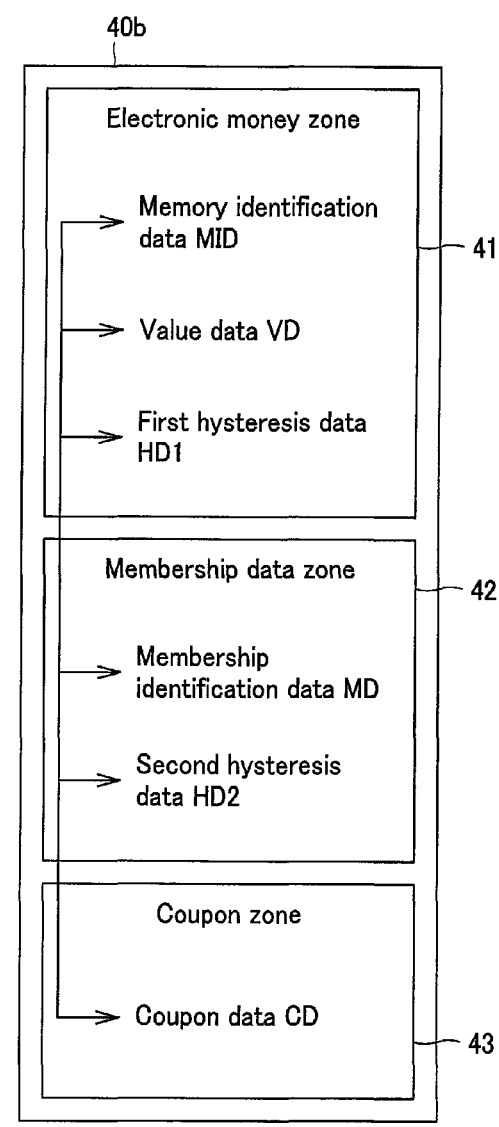

The second IC card 40b includes functions in addition to those owned by the first IC card 40a. Here, the second IC card 40b is a card used as a membership card of the hotel H. This second IC card 40b includes, in its memory device, a membership data zone 42 and a coupon zone 43, in addition to the aforementioned electronic money zone 41, as shown in FIG. 5(B). In the membership data zone 42, there are stored membership identification data MD and second hysteresis data HD2. The membership identification data MD includes e.g. a membership number, the client's rank, name, telephone number, address and the e-mail address. The second hysteresis data HD2 includes data on when the hotel H has been used and which hotel has been used in case the hotel H is a unit of a hotel chain, and use hysteresis, such as logs in case of using the display terminal device 32a, 32b or 32c. In the coupon zone 43, there are stored e.g. coupon data CD as downloaded from the display terminal device 32a, 32b or 32c. The membership identification data MD, second hysteresis data HD2 and the coupon data CD are associated with the memory identification data MID.

The first IC card 40a and the second IC card 40b are collectively referred to below as the IC card 40. According to the present invention, the IC card 40 may include further functions, such as the functions of a credit card or a debit card, in addition to the functions of the first and second IC cards 40a, 40b. According to the present invention, the memory may not be the IC card 40 but may also be a mobile information processing terminal device, such as a mobile phone or an electronic memo book, having enclosed therein a variety of components that implement the functions of the IC card 40. It is only sufficient that the terminal device is a mobile device in the sense that the terminal device may be carried out by the user.

When having communication with the first IC card 40a, the first reader/writer 35 of the display terminal device 32a, 32b or 32c reads out at least the memory identification data MID from the electronic money zone 41. That is, when the user has browsed the edited advertisement data ED, using the display terminal device 32a, 32b or 32c, the first reader/writer 35 reads out the memory identification data MID from the electronic money zone 41 of the first IC card 40a. Further, when the user has browsed the edited advertisement data ED, using the display terminal device 32a, 32b or 32c, and has purchased the goods being advertised, the first reader/writer 35 reads out the memory identification data MID from the electronic money zone 41 of the first IC card 40a, and subtracts value data VD corresponding to the price of the goods to update the first hysteresis data HD1.

The display terminal devices 32a to 32c are managed by the hotel H. Thus, when having communication with the second IC card 40b, the first reader/writer 35 of the display terminal device 32a, 32b or 32c not only reads from or writes in the electronic money zone 41 of the second IC card 40b, similar to that of the first IC card 40a, but also accesses the membership data zone 42. The first reader/writer 35 then reads out the membership identification data MD, at the same time as it updates the second hysteresis data HD2. Moreover, when the user has browsed the edited advertisement data ED, using the display terminal device 32a, 32b or 32c, and downloaded the coupon data CD, the first reader/writer 35 writes the coupon data CD in the coupon zone 43.

An IC card handling store A manages a store terminal device 51, as shown in FIG. 1. This IC card handling store A may be the aforementioned advertiser B or the advertiser C, located within 500 m from the hotel H, and actually handling the goods advertised by the first and second advertisement data AD1, AD2. The store terminal device 51, managed by the store A, handling the IC card 40, is a device to a POS (Point Of Sale) terminal of which is connected the second reader/writer 52 of the IC card 40 via wired or wireless path. The store terminal device 51 is also a device mounted in a second location different from the location where the display terminal device 32a, 32b or 32c is installed. This second reader/writer 52 communicates with the IC card 40 in accordance with RFID.

Unlike the case of the antenna coil of the above-described first reader/writer 35, it is not essential for the antenna coil of the second reader/writer to be light transmitting. When having communication with the first IC card 40a, that is, when making settlement for purchasing goods, the second reader/writer 52 reads out the memory identification data MID from the electronic money zone 41 of the first IC card 40a, while subtracting the amount corresponding to the price of the goods from the value data VD to update the first hysteresis data HD1. Also, when communicating with the second IC card 40b for purchasing the goods, the second reader/writer 52 reads out the memory identification data MID from the electronic money zone 41 of the first IC card 40a, while subtracting the amount corresponding to the price of the goods from the value data VD to update the first hysteresis data HD1. If there is corresponding coupon data CD in the coupon zone 43 of the second IC card 40b, the contents of the coupon data are reflected in the price and the coupon data CD in the coupon zone 43 is wiped off.

After a preset time period, the memory identification data MID of the IC card 40 is transmitted by a company M managing the IC cards from an IC card management device 61 to a hysteresis management device 23 supervised by the system manager S. This is reported by the IC card managing company M to the system manager S. The hysteresis management device 23 of the system manager S collates the data to the memory identification data MID of the IC card 40 issued by a predetermined advertiser, such as advertiser B, the coupon discount ratio is to be applied to. The hysteresis management device 23 testifies to the fact that the coupon issued by the advertiser B has been acquired by the owner of the IC card 40 in the hotel H, using the first reader/writer 35 in the display terminal device 32a, 32b or 32c. The result is sent to the IC card management device 61 of the IC card management device M and reported from the system manager S to the IC card management device M. The IC card management device 61 of the company M applies the coupon discount ratio corresponding to the amount used by the owner of the IC card and transmits the use data testifying to the application of the coupon to the hysteresis management device 23 of the system manager S. The hysteresis management device 23 updates the information on the unused coupon, relevant to the memory identification data MID of the IC card 40, to the used state.

It should be noted that the second reader/writer 52 is unable to access the membership data zone 42 of the second IC card 40b, since second reader/writer is economically or organizationally irrelevant to the hotel H. On the other hand, if the first and second reader/writers 35, 52 belong to the economically or organizationally same business organization and are authorized to access the first IC card 40a, the second reader/writer is able to access e.g. the first hysteresis data HD1 relevant to the owner of the first IC card 40a.

If goods have been purchased by the first reader/writer 35 of the display terminal device 32a, 32b or 32c installed in the hotel H and/or by the second reader/writer 52 of the store terminal device 51 installed in the IC card handling store A, as shown in FIG. 1, the display terminal device 32a, 32b or 32c or the store terminal device 51 accesses the IC card management device 61 managed by e.g. the IC card handling company M.

The IC card management device 61 has a constitution similar to that of a routine computer, and includes e.g. a hard disc, a ROM, a RAM, a CPU, a display unit, such as an LCD or a CRT, an input device, such as a keyboard or a mouse, an input I/F for an external storage device, such as an optical disc, and a communication I/F for communication with a network, such as the Internet. The IC card management device 61 manages the electronic money zone 41 of the first or second IC card 40a, 40b. The IC card management device 61 manages the electronic money zone 41 of the first or second IC card 40a or 40b. The IC card management device 61 manages the memory identification data MID transmitted from the communication I/F 36 of the display terminal device 32a, 32b or 32c or from the store terminal device 51 over the network. The hysteresis management device 23, managed by the system manager S, receives and authenticates e.g. the first hysteresis data HD1. The hysteresis management device manages, in a database, constructed like a hard disc, the first hysteresis data HD1 and the memory identification data MID, as the data MDI and the data HD1 are correlated to each other. These data have been received from the IC card management device 61 managed by the IC card management company M via encrypted secure communication network or a mobile recording medium, The hysteresis management device 23 also manages the coupon data CD in relation with the memory identification data MID. The reason is that, when the user has acquired the coupon data CD using the first IC card 40a not having the coupon zone 43, the hysteresis management device is unable to save the coupon data CD in the first IC card 40a.

Referring to FIG. 1, the data processing system 1 of the present invention further includes, as devices managed by the system manager S, a hysteresis management device 23, supervising the hysteresis of the IC card 40, and a hysteresis analysis unit 24, supervising the hysteresis of the IC card 40.

The IC card management device 23 has a constitution similar to that of a routine computer, and includes e.g. a hard disc, a ROM, a RAM, a CPU, a display unit, such as an LCD or a CRT, an input device, such as a keyboard or a mouse, an input IF for an external storage device, such as an optical disc, and a communication I/F for communication with a network, such as the Internet.

This hysteresis management device 23 receives hysteresis data when the first reader/writer 35 of the display terminal device 32a, 32b or 32c has accessed the first IC card 40a or the second IC card 40b, via the network, and manages these hysteresis data in relation to one another in a database constructed in e.g. a hard disc. Examples of these hysteresis data include the memory identification data MID, transmitted from the communication I/F 36, address data of the edited advertisement data ED accessed, membership identification data MD and the first and second hysteresis data HD1, HD2. The hysteresis management device 23 also receives, via the IC card management device 61, the first hysteresis data HD1 and the memory identification data MID of the electronic money zone 41 of the first IC card 40a and the second IC card 40b in the IC card handling store A. These data have been transmitted from the IC card management device 61.

Figure 6:
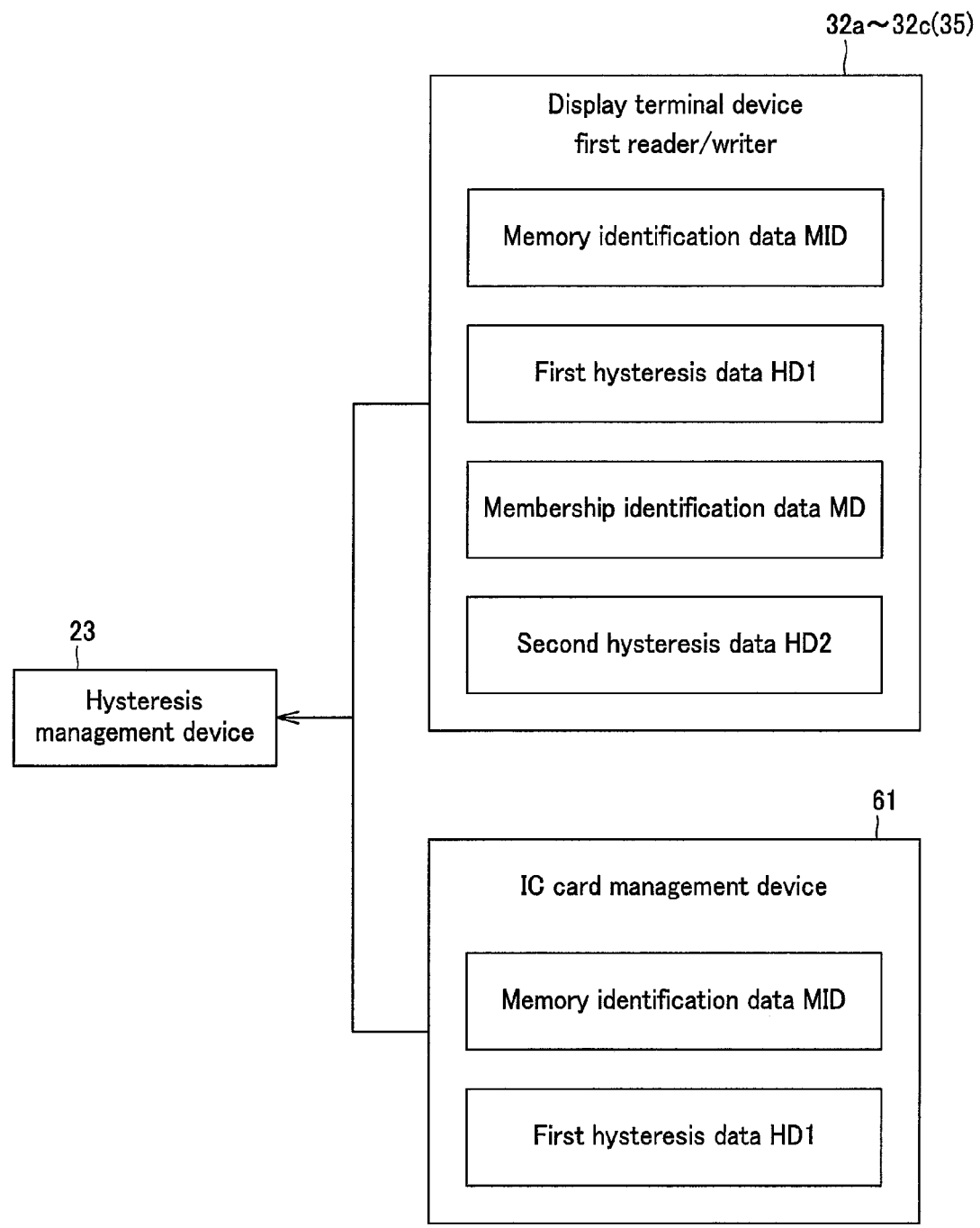
FIG. 6 is a schematic block diagram showing data furnished to a hysteresis management unit.

Thus, in the hysteresis management device 23, there are stored the memory identification data MID, first hysteresis data HD1, membership identification data MD and the second hysteresis data HD2, acquired by the first reader/writer 35 of the display terminal device 32a, 32b or 32c, as shown in FIG. 6. There are also stored, as hysteresis data relevant to the goods purchasing hysteresis, managed by the IC card management device 61, the memory identification data MID and the first hysteresis data HD1. These stored data are transmitted via the network or the mobile recording medium to the hysteresis analysis unit 24.

The hysteresis analysis unit 24 has a constitution similar to that of a routine computer, and includes e.g. a hard disc, a ROM, a RAM, a CPU, a display unit, such as an LCD or a CRT, an input device, such as a keyboard or a mouse, an input I/F for an external storage device, such as an optical disc, and a communication I/F for communication with a network, such as the Internet. The hysteresis analysis unit 24 extracts the first hysteresis data HD1, associated with the memory identification data MID supervised by the IC card management device 61 and which are coincident with the memory identification data MID as acquired by the display terminal device 32a, 32b or 32c installed in the hotel H.

This is now explained with reference to FIGS. 7(A) to 7(C). FIG. 7(A) shows the memory identification data MID, first hysteresis data HD1, membership identification data MD and the second hysteresis data HD2, acquired by the first reader/writer 35, installed in the hotel H. FIG. 7(B) shows the memory identification data MID and the first hysteresis data HD1, supervised by the IC card management device 61. The memory identification data MID [0003] and [0009] from the first reader/writer 35 of FIG. 7 coincide with the memory identification data MID from the IC card management device 61. The hysteresis analysis unit 24 extracts the first hysteresis data HD1 ([BBB] and [FFF]), membership identification data MD ([H002]) and the second hysteresis data HD2 ([YYY]) of the coincident memory identification data MID [0003], to generate analysis data D, as shown in FIG. 7(C). The hysteresis analysis unit 24 also extracts the first hysteresis data HD1 ([DDD] and [HHH]), membership identification data MD ([H004]) and the second hysteresis data HD2 ([XYZ]) of the coincident memory identification data MID [0009], to process and generate the analysis data D. This analysis data D is generated e.g. in a CSV (Comma Separated Value) or HTML (Hyper text Markup Language) form.

The analysis data D, generated by the hysteresis analysis unit 24, is supplied via the network or a mobile recording medium to a hotel management device 39, managed by the hotel H, as shown in FIG. 1. This hotel management device 39 has a constitution similar to that of a routine computer, and includes e.g. a hard disc, a ROM, a RAM, a CPU, a display unit, such as an LCD or a CRT, an input device, such as a keyboard or a mouse, an input I/F for an external storage device, such as an optical disc, and a communication I/F for communication with a network, such as the Internet. The hotel management device 39, supplied with the analysis data D from the hysteresis analysis unit 24, browses and further analyzes the analysis data D to analyze the behavior pattern of the users of the hotel H.

With the analysis data D, shown in FIG. 7(C), the hotel H is able to acquire the private information of the user, such as name, age and the address, from the membership data MD [H0002] associated with the memory identification data MID [0003]. The hotel is also able to know, from the second hysteresis data HD2 [YYY], which of the edited advertisement data ED has aroused the interest of the user. Moreover, from the first hysteresis data HD1 [BBB] and [FFF], the hotel is able to learn how far from the hotel H is the store the user visited and what goods the user purchased. In this manner, the hotel H is able to determine the contents of the relevant data RD generated by the hotel H or the contents of the second advertisement data AD2 and the third advertisement data AD3 included in the edited advertisement data ED. That is, the hotel H is able to know the users of the hotel and the behavior pattern of the users who used the display terminal device 32a, 32b or 32c, specified by the place identification data PID, based on the analysis data D.

In the above-described embodiment, the advertisers B and C are within 500 m apart from the hotel H. If the presupposed behavior range of the users is broader than this, the advertisers B and C may be selected from a broader range.

The processing sequence of the data processing system 1, embodying the present invention, is now described. Initially, the sequence of operations since the generation of the edited advertisement data ED until distribution thereof to the display terminal device 32a, 32b or 32c is described.

Initially, the first to third advertisement input units 10a to 10c are responsive to the operations by the advertisers A to C to generate preset first to third advertisement data AD1 to AD3. Specifically, the advertiser A is here a leading advertisement agency and generates, in the first advertisement input unit 10a, the first advertisement data AD1 which is irrelevant to a preset area, such as an area within 500 m apart from the hotel H. For example, the first advertisement input unit 10a is responsive to the operation by the advertiser A to generate advertisement data for a predetermined beer maker. Specifically, the first advertisement input unit 10a is responsive to the operation by the advertiser A to generate distribution condition data in addition to data of the HTML form that directly constitutes the distribution condition data. These condition data may, for example be display time durations (such as 15 or 30 seconds) during which the advertisement data are displayed on the display terminal device 32a, 32b or 32c, time zones, number of times of repetitions or the display time periods.

The advertisers B and C are e.g. owners of the stores located within 500 m of the hotel H, and generate the goods handled by the stores, and the coupon data CD, by the second and third advertisement input units 10b and 10c. Specifically, the second and third advertisement input units 10b and 10c generate, responsive to actuations by the advertisers A, C, the data of the HTML or CHTML (Compact HTML), that make up the second and third advertisement data AD2, AD3, such as store names, moving picture files, still image files, store names, addresses, telephone numbers, or discount rates of the coupon data. The first to third advertisement input units 10a to 10c transmit the so generated data to the editing device 21 of the system manager S, via the network or via the mobile recording medium, as shown in FIG. 1.

The hotel input device 31, managed by the hotel H, is responsive to the operation by an operator of the hotel H in charge to generate the hotel related data RD, to be furnished to the users, such as hotel guests. The hotel related data RD include the weather information, information on near-by facilities, traffic information, information on utensils equipped in guest rooms, or the advertisement information on trial or prototyped products. The hotel input device 31 then transmits the so generated information via the network or the mobile recording medium to the editing device 21 managed by the system manager S.

Figure 8:
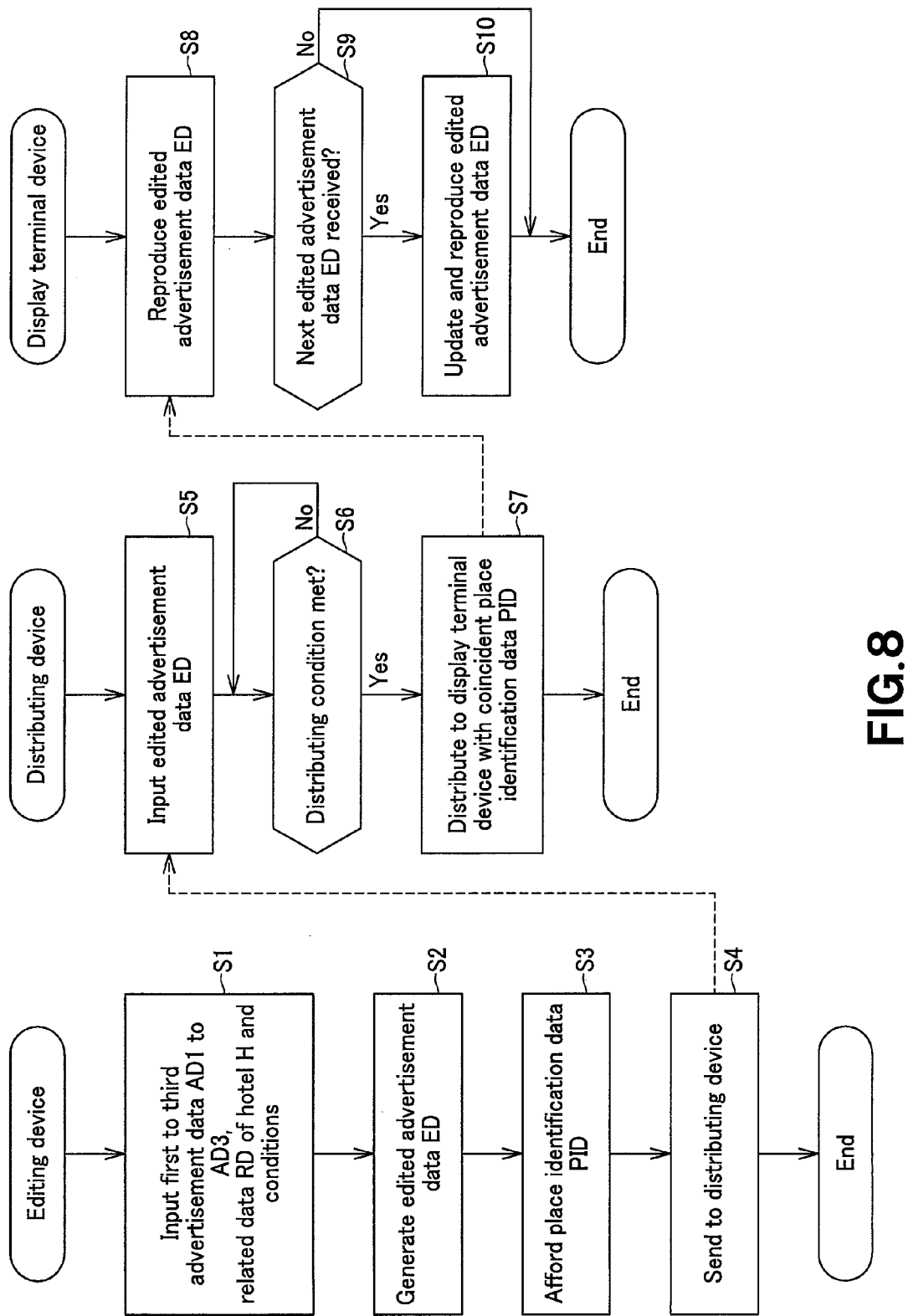
FIG. 8 is a flowchart showing a sequence of operations as from generation of the editing advertisement data until distribution thereof to the display terminal unit.

When the first to third advertisement data AD1 to AD3 from the first to third advertisement input units 10a to 10c and the hotel related data RD from the hotel input device 31 have been supplied in a step S1, as shown in FIG. 8, the editing device 21, managed by the system manager S, edits the first to third advertisement data AD1 to AD3 and the hotel related data RD, in a step S2, to generate edited advertisement data ED. The edited advertisement data ED generated are such data in which the first to third advertisement data AD1 to AD3 are displayed on the display screen in three divided portions or in which one or more advertisement data are displayed superposed on other advertisement data. Also, the advertisement data AD1 to AD3 are of a layered structure, such that, when one of the advertisement data is selected, detailed lower-layer advertisement data are simultaneously displayed.

In a step S3, the editing device 21 affords the place identification data PID, allocated to the display terminal device 32a, 32b or 32c of the hotel H, to the edited advertisement data ED. In a step S4, the editing device 21 transmits the edited advertisement data ED, afforded with the place identification data PID, to the distributing device 22 via the network or the mobile recording medium.

The distributing device 22, supplied in a step S5 with the edited advertisement data ED, afforded with the place identification data PID, verifies, in a step S6, whether or not the distributing condition, such as distributing time, of each edited advertisement data ED has been met. When the distribution condition is met, the distributing device 22 in a step S7 accesses the database to distribute the edited advertisement data, via the network, to address data of the display terminal device 32a, 32b or 32c coincident with the place identification data PID appended to the input edited advertisement data ED.

In a step S8, the display terminal device 32a, 32b or 32c, installed in the hotel H, sequentially reproduces the edited advertisement data ED, transmitted from the distributing device 22, to display the data on the display unit 33. In a step S9, the display terminal device 32a, 32b or 32c checks to see whether or not the next or new edited advertisement data ED, transmitted from the distributing device 22, has been received. In a step S10, the display terminal devices sequentially display the next or new edited advertisement data ED.

Figure 9:
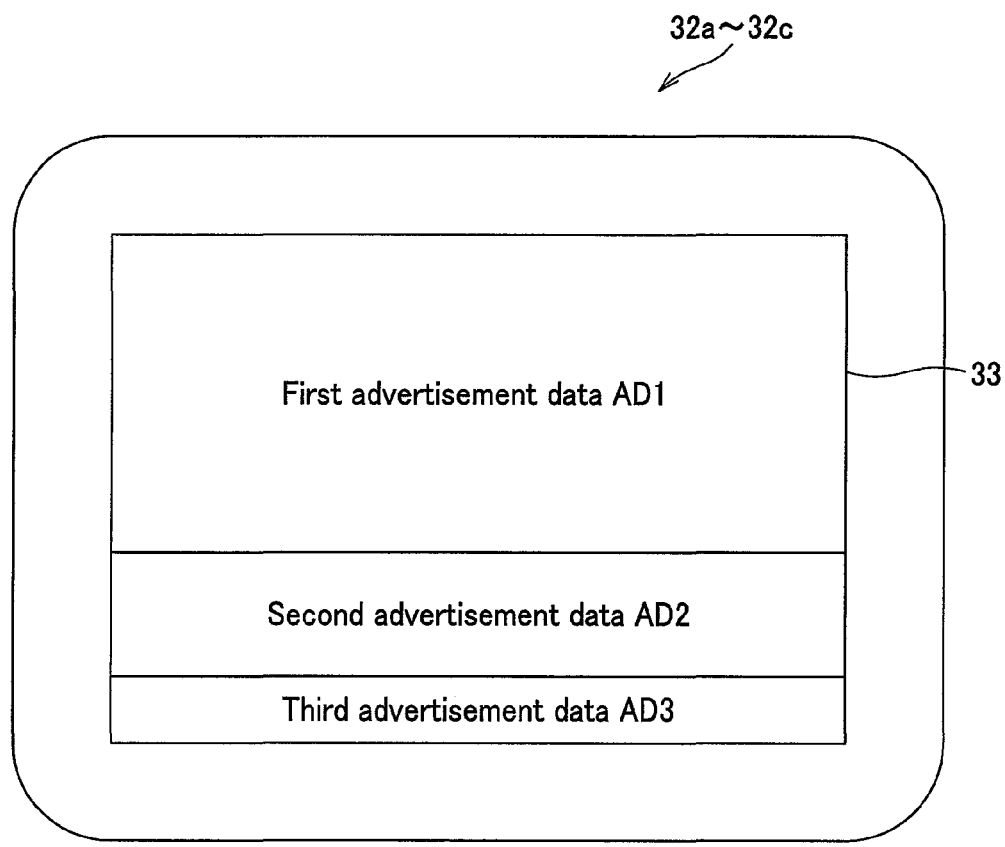
FIG. 9 is a schematic view showing the editing advertisement data displayed on a display of the display terminal unit.

In the display terminal device 32a, 32b or 32c, the first to third advertisement data AD1 to AD3 are displayed on the display screen of the display unit 33 as three divided portions, as shown in FIG. 9. In the case shown in FIG. 9, the first display data AD1 is displayed most pronouncedly in the uppermost row, the second display data AD2 is displayed in the next lower row and the third display data AD3 is displayed in the bottom row. The display areas or locations of the first to third advertisement data AD1 to AD3, displayed in the display unit 33, are not limited to those shown in FIG. 9. For example, the advertisement data desired to be emphasized most strongly may be displayed most pronouncedly at a mid portion on the display screen, or one or more advertisement data may be displayed superimposed on other advertisement data. Thus, in the display terminal device 32a, 32b or 32c, installed in the hotel H, the edited advertisement data ED, shown in FIG. 9, are displayed in the display unit 33 to allow the users of the hotel H at the guest rooms or at a lobby to view the edited advertisement data ED. Since the advertisement data AD2 or AD3 of the second advertiser B or the third advertiser C located in the vicinity of the hotel H is included in this edited advertisement data ED, it is possible for the hotel H to provide the hotel users, that is, hotel guests, with the information on the near-by stores.

In the above-described embodiment, the case of directly distributing the edited advertisement data ED to the display terminal device 32a, 32b or 32c has been described. It is however possible to install a hotel server, as a proxy server, the place identification data PID has been allocated to, in the hotel H, and to distribute the edited advertisement data ED from the distributing device 22 to the hotel server. The edited advertisement data ED, received by the hotel server, may then be distributed to the display terminal device 32a, 32b or 32c installed in the hotel H. In addition, to furnish the information, tailored to the hotel guests, the hotel server may add to the edited advertisement data ED the guest-room-based information on the stores or goods, entered from the hotel input device 31, and distribute the resulting data to the display terminal device 32a, 32b or 32c of each guest room.

The sequence of operations in case the user has acted on the display terminal device 32a, 32b or 32c is now described with reference to FIG. 10.

In a step S11, the display terminal device 32a, 32b or 32c checks to see which of the first to third advertisement data AD1 to AD3 has been selected on the display screen shown in FIG. 9. Then, in a step S12, the selected one of the first to third advertisement data AD1 to AD3 is displayed on the display unit 33. The first to third advertisement data AD1 to AD3 are of the layered structure, as described above, so that, when the user has selected scrolling to lower layers on the displayed picture image, the display terminal device 32a, 32b or 32c displays advertisement data in the progressively lower layer. Each time the advertisement data in the progressively lower layer is displayed, the display terminal device 32a, 32b or 32c records log data, such as address data or time/date data, of the advertisement data recorded in e.g. the hard disc.

Meanwhile, the display terminal device 32a, 32b or 32c periodically furnishes the log data to the hysteresis management device 23 and/or to the hysteresis analysis unit 24, over the network, to allow the hysteresis analysis unit 24 to generate analysis data of each display terminal device 32.

Figure 11:
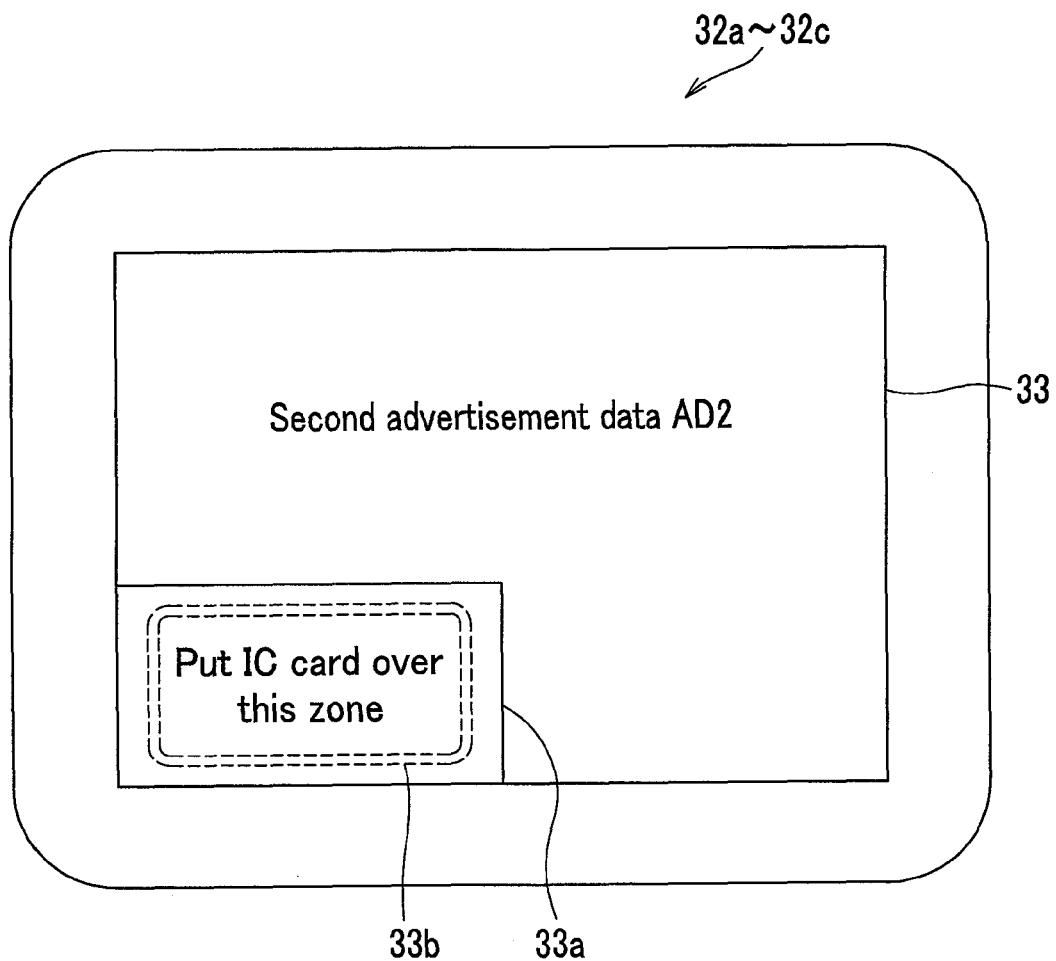
FIG. 11 is a plan view of the display of the display terminal unit when a page for communication with the IC card has been displayed on the display of the display terminal unit.

The display terminal device 32a, 32b or 32c then scrolls to the advertisement data below the second advertisement data AD2. A picture image in need of the IC card 40 is then displayed. In this picture image, in need of the IC card 40, there is presented a card area 33a over which to put the IC card 40, as shown in FIG. 11. This card area 33a is displayed in an area of the surface of the display unit 33 provided with an antenna coil 33b configured to communicate with the IC card 40. In a step S13, the first reader/writer 35 of the display terminal device 32a, 32b or 32c checks to see whether or not the antenna coil has been magnetically coupled with the IC card 40 to verify whether or not the IC card 40 has been placed above the card area.

The card area 33a may be lit on its rim when the IC card 40 has been placed in position to intimate the user that the card area is in an activated state, that is, in the state of communication. The card area 33a may also issue the effect sound, such as the coin clashing sound.

Meanwhile, even if the antenna coil 33b of the card area 33a is not correctly in register with the IC card, the first reader/writer 35 of the display terminal device 32a, 32b or 32c may determine whether or not the IC card 40 has been put in position, by verifying that the antenna coil 33b of the card area 33a has been magnetically coupled with the IC card 40.

In a step S14, the first reader/writer 35 of the display terminal device 32a, 32b or 32c verifies whether or not the IC card 40, involved in communication, is the first IC card 40a. That is, the first reader/writer verifies the sort of the IC card 40. It is because the first IC card 40a lacks in the membership data zone 42. The display terminal device 32a, 32b or 32c verifies the sort of the IC card 40 by reading out the identification data, indicating the sort of the IC card 40, by the first reader/writer 35. This card sort check is carried out by the first reader/writer 35 of the display terminal device 32a, 32b or 32c referring to the sort identification data allocated to the first IC card 40a and the second IC card 40b.

When the IC card, involved in the communication, is the first IC card 40a, the first reader/writer 35 of the display terminal device 32a, 32b or 32c reads out and acquires the memory identification data MID in the electronic money zone 41. When the IC card, involved in the communication, is the second IC card 40b, the first reader/writer 35 of the display terminal device 32a, 32b or 32c reads out and acquires the memory identification data MID in the electronic money zone 41 and the membership data MD in the membership data zone 42.

In a step S17, the display terminal device 32a, 32b or 32c transmits hysteresis data of the IC card 40 to the hysteresis management device 23 via the network. Specifically, when the IC card is the first IC card 40a, the display terminal device 32a, 32b or 32c transmits the memory identification data MID in the electronic money zone 41 to the hysteresis management device 23. The display terminal device 32a, 32b or 32c may correlate e.g. the address data of the advertisement data, recorded as log and displayed, with the memory identification data MID, and transmit the resulting data to the hysteresis management device 23. This generates analysis data D which, though anonymous, are correlated with the memory identification data MID. In case the IC card is the second IC card 40b, the display terminal device 32a, 32b or 32c transmits the memory identification data MID of the electronic money zone 41 and the membership data MD of the membership data zone 42, as well as the address data of the displayed advertisement data, recorded as log in the form of the second hysteresis data HD2, to the hysteresis management device 23. By so doing, the hysteresis of user access events at the display terminal device 32a, 32b or 32c may be stored in the hysteresis management device 23.

Figure 12:
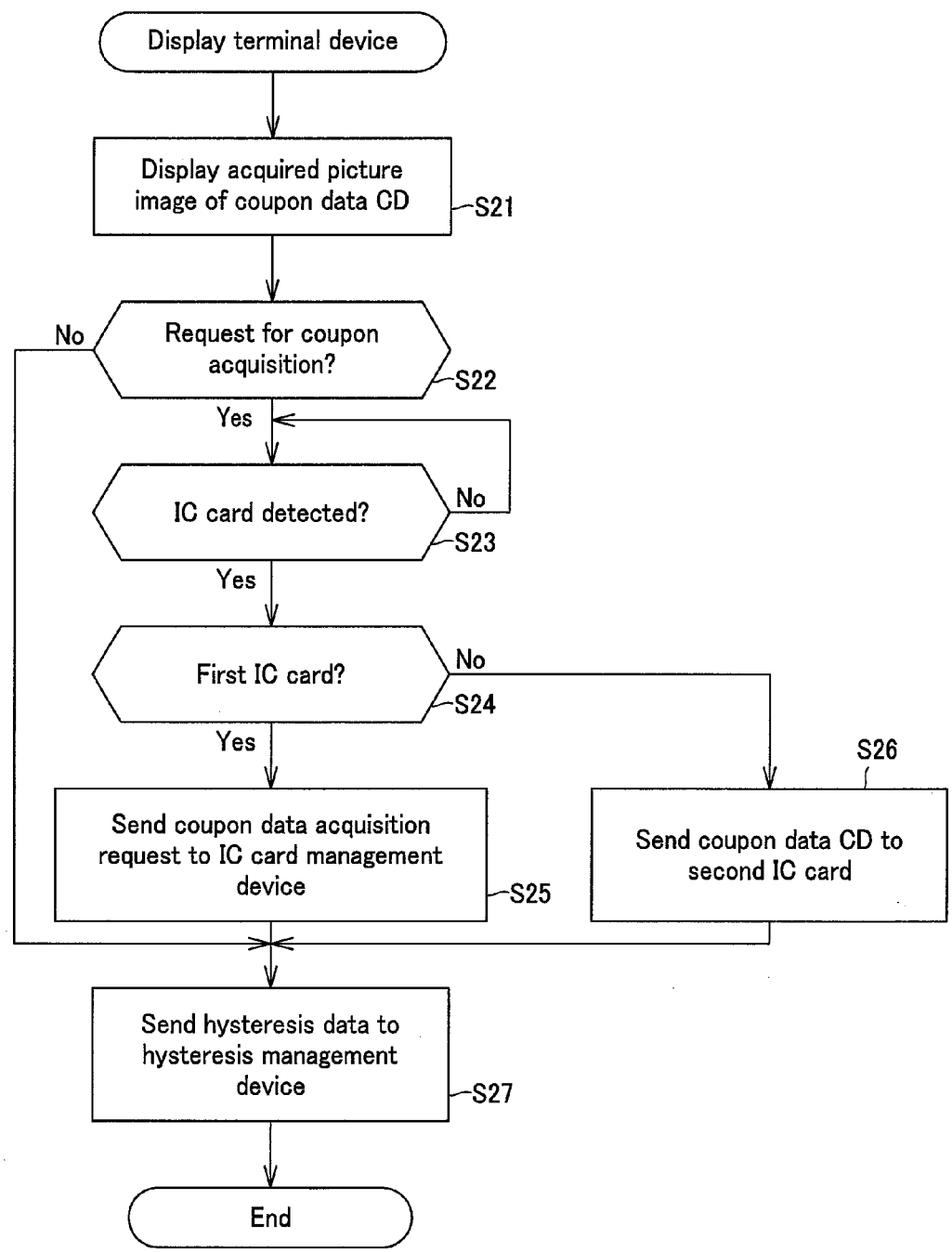
FIG. 12 is a flowchart showing a sequence of operations at the time of acquisition of coupon data.

The sequence of operations until the user acquires coupon data CD in the display terminal device 32a, 32b or 32c is now described with reference to FIG. 12.

In a step S21, the display terminal device 32a, 32b or 32c is responsive to the user's actuation to display an acquired picture image of the coupon data CD in a low-layer page of the second advertisement data AD2 or the third advertisement data AD3.

Like the picture image for communication with the IC card 40, the acquired picture image of the coupon data CD, displayed on the display unit 33 of the display terminal device 32a, 32b or 32c, displays the card area 33a in register with an area of the antenna coil 33b on the surface of the display unit 33 that communicates with the IC card 40. In a step S22, the display terminal device 32a, 32b or 32c checks to see whether or not the operation of a request for acquiring the coupon data CD has been done. If the request operation has been done, the first reader/writer 35 in a step S23 verifies whether or not the card area has been magnetically coupled with the IC card 40 to verify whether or not the IC card 40 has been put over the card area.

On detection of the IC card 40, the first reader/writer 35 of the display terminal device 32a, 32b or 32c in a step S24, it is verified whether or not the IC card 40, involved in communication, is the first IC card 40a. That is, the first reader/writer 35 verifies the sort of the IC card 40. It is because the first IC card 40a lacks in the membership data zone 42 in which to store coupon data, as shown in FIG. 5. This card sort check is carried out by the first reader/writer 35 of the display terminal device 32a, 32b or 32c referring to the sort identification data allocated to the first IC card 40a and the second IC card 40b.

When the IC card 40, involved in communication, is the first IC card 40a, the first reader/writer 35 of the display terminal device 32a, 32b or 32c in a step S25 reads out and acquires the memory identification data MID in the electronic money zone 41, while transmitting an acquisition request for the coupon data CD to the IC card management device 61. It is because the first IC card 40a lacks in the area in which to store the coupon data CD such that it is necessary for the IC card management device 61 to supervise the coupon data. The IC card management device 61 supervises, in its database, the acquisition request for the coupon data CD, in association with the memory identification data MID. Thus, the user owning the first IC card 40a and the user owning the second IC card 40b may use the coupon data CD at any time in the IC card handling store A. The hysteresis management device 23 supervises the issuing state of the coupon data CD for both the first IC card 40a and the second IC card 40b.

When the IC card 40, involved in communication, is the second IC card 40b, the display terminal device 32a, 32b or 32c in a step S26 transmits the coupon data CD to the second IC card 40b. The coupon data CD transmitted from the display terminal device 32a, 32b or 32c are stored in the coupon zone 43 of the memory.

Figure 10:
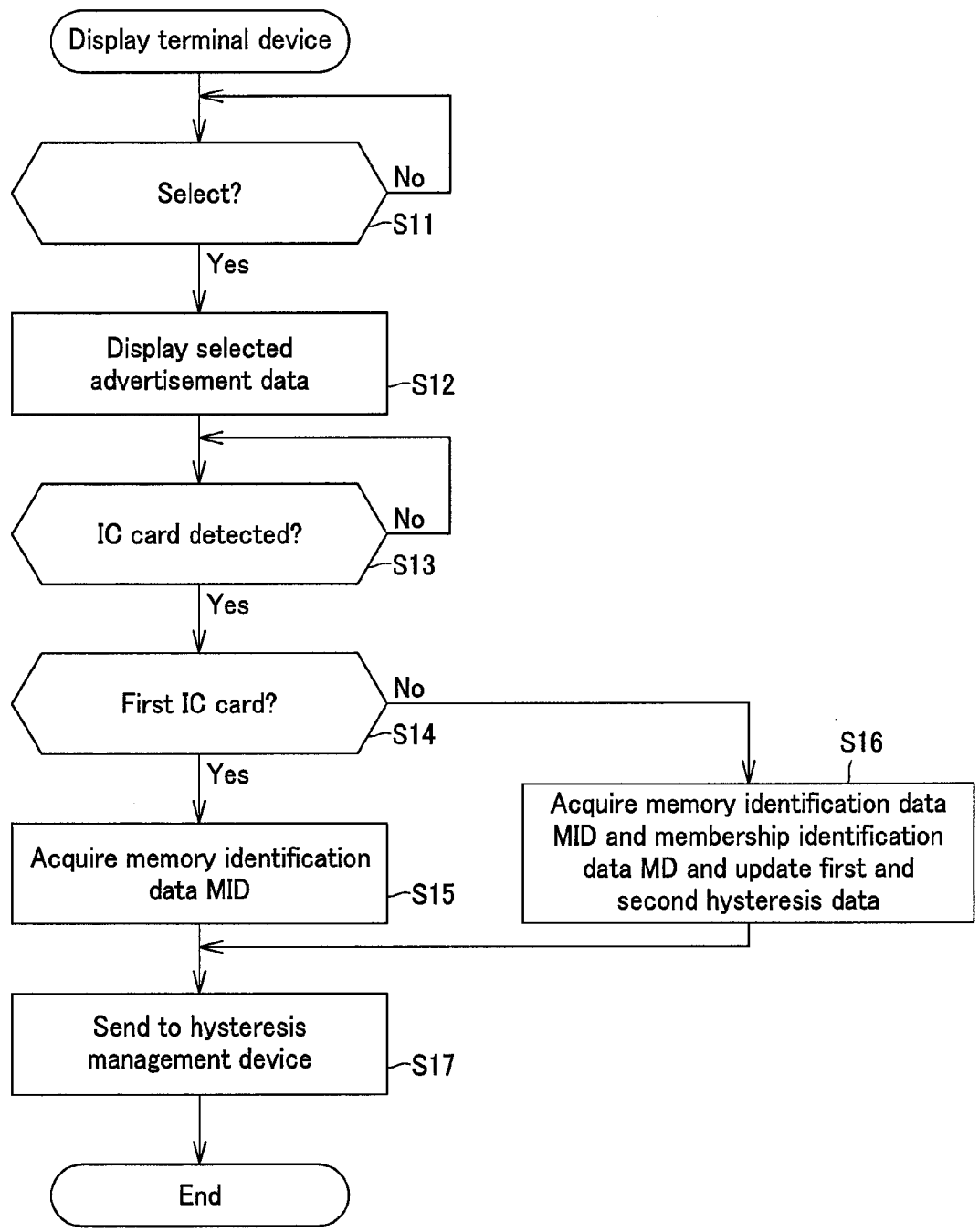
FIG. 10 is a flowchart showing the sequence of operations when the user has acted on the display terminal unit.

In a step S27, as in the step S17 of FIG. 10, the display terminal device 32a, 32b or 32c transmits hysteresis data of the IC card 40 to the hysteresis management device 23, in order to supervise the use hysteresis of the IC card 40 over the network.

Figure 13:
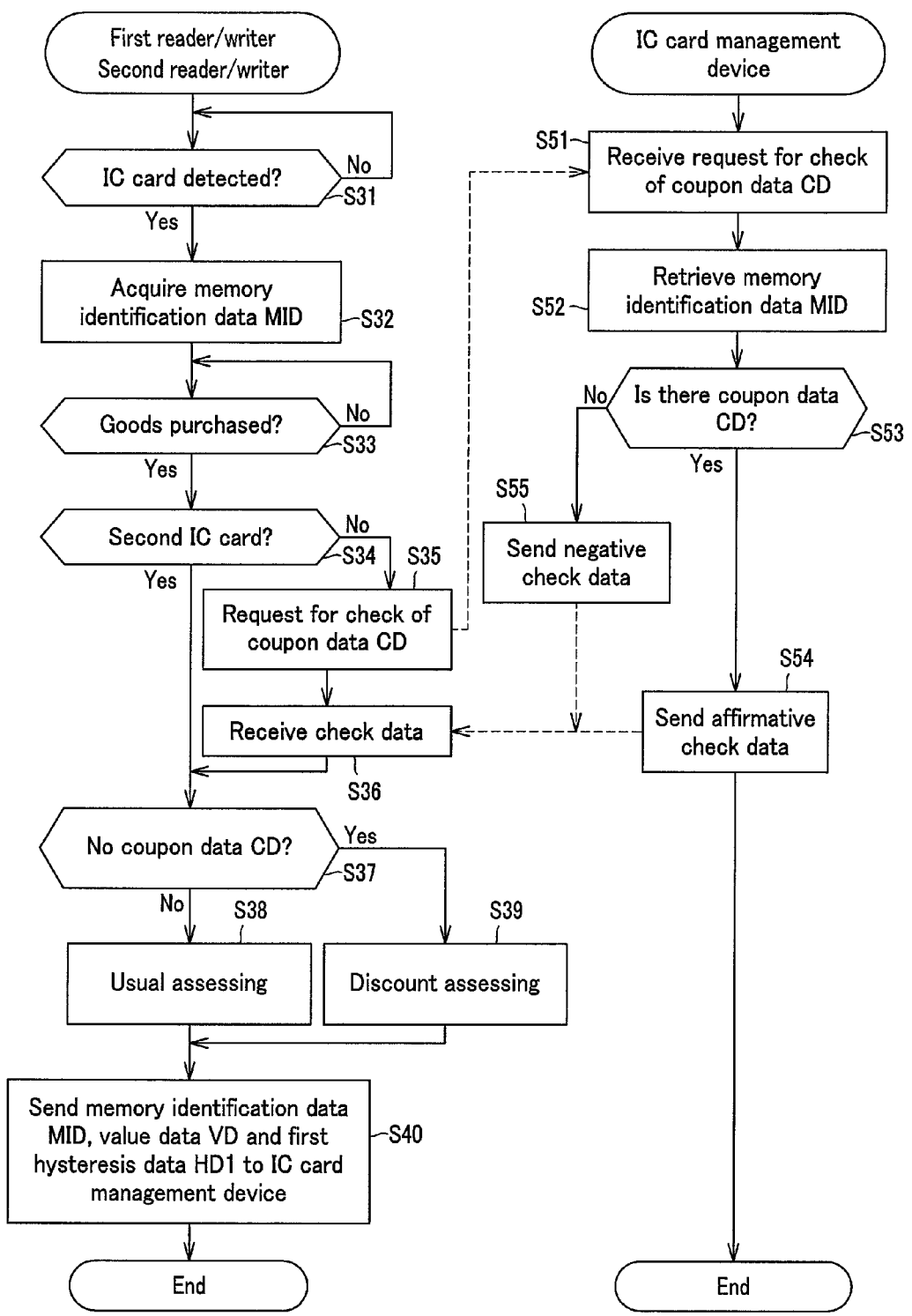
FIG. 13 is a flowchart showing a sequence of operations when the user purchases a goods.

The sequence of operations in case the user purchases goods with the IC card 40 is now descried with reference to FIG. 13.

In a step S31, the first reader/writer 35 of the display terminal device 32a, 32b or 32c and the second reader/writer 52 of the store terminal device 51 installed in the IC card handling store A check to see whether or not the card area has been magnetically coupled to the IC card 40 to verify whether or not the IC card 40 has been put over the card area. In a step S32, the first reader/writer 35 or the second reader/writer 52 reads out and acquires the memory identification data MID of the electronic money zone 41 of the IC card 40. In a step S33, the first reader/writer 35 or the second reader/writer 52 verifies whether or not the goods have been purchased by the user or the salesperson.

When the operation of purchasing goods has been done, the first reader/writer 35 or the second reader/writer 52 in a step S34 verifies whether or not the IC card 40 involved in communication is the second IC card 40b. That is, the first reader/writer 35 or the second reader/writer 52 verifies the sort of the IC card 40. It is because the second IC card 40b has the coupon zone 43 in which to store the coupon data CD, while the first IC card 40a does not. Thus sort check is carried out by the first reader/writer 35 referencing sort identification data allocated to the first IC card 40a and the second IC card 40b.

When the IC card 40, involved in the communication, is the first IC card 40a not having the coupon zone 43, the first reader/writer 35 or the second reader/writer 52 in a step S35 transmits the check request data, along with the memory identification data MID, to the IC card management device 61, in order to check for the presence or absence of the coupon data CD managed by the IC card management device 61.

On receipt in a step S51 of the check request for the coupon data CD, transmitted from the first reader/writer 35 or the second reader/writer 52, along with the memory identification data MID, the IC card management device 61 in a step S52 accesses the database to retrieve the same memory identification data MID as the received memory identification data MID.

If there is the same memory identification data MID as the received memory identification data MID, the IC card management device 61 in a step S53 verifies whether or not the memory identification data MID is associated with the coupon data CD. If there is the coupon data CD, the IC card management device 61 in a step S54 transmits to the first reader/writer 35 or the second reader/writer 52 check data to the effect that there is the coupon data CD. When transmitting the check data to the effect that there is the coupon data CD, the IC card management device 61 simultaneously transmits the contents of the coupon data CD to the first reader/writer 35 or the second reader/writer 52.

If there is no coupon data CD, the IC card management device 61 in a step S54 transmits to the first reader/writer 35 or the second reader/writer 52 check data to the effect that there is no coupon data CD. The first reader/writer 35 or the second reader/writer 52 in a step S36 receives the check data to the effect that there is or there is no coupon data CD, transmitted from the IC card management device 61.

In a step S37, the first reader/writer 35 or the second reader/writer 52 verifies the presence or the absence of the coupon data CD. That is, when the IC card 40 is the second IC card 40b, provided with the coupon zone 43, the first reader/writer 35 or the second reader/writer 52 accesses the coupon zone 43 of the second IC card 40b, to check whether or not there is no coupon data CD. On the other hand, when the IC card 40 is the first IC card 40a, devoid of the coupon zone 43, the first reader/writer 35 or the second reader/writer 52 verifies whether or not there is no coupon data CD, based on the check data transmitted from the IC card management device 61.

When there is no coupon data CD, the first reader/writer 35 or the second reader/writer 52 carries out normal assessing, that is, unprivileged assessing, i.e. the processing of accessing the electronic money zone 41 of the IC card 40 and subtracting the value data in an amount corresponding to the price of the goods purchased. The first reader/writer 35 or the second reader/writer 52 also updates the first hysteresis data. When there is the coupon data CD, the first reader/writer 35 or the second reader/writer 52 in a step S39 carries out discount assessing, that is, privileged assessing, i.e. the processing of accessing the electronic money zone 41 of the IC card 40 and subtracting the value data in an amount corresponding to deduction from the price of the goods purchased, while simultaneously updating the first hysteresis data HD1. The first reader/writer 35 or the second reader/writer 52 also sums points equivalent to the coupon data CD.

In a step S40, the first reader/writer 35 or the second reader/writer 52 transmits the first hysteresis data HD1, associated with the memory identification data MID, to the IC card management device 61. The IC card management device 61 then is able to store the first hysteresis data HD1, in its database, in association with the memory identification data MID.

When communicating with the second IC card 40b, the first reader/writer 35 may transmit the membership identification data MD of the membership data zone 42 or the second hysteresis data HD2 to the hysteresis analysis unit 24 in order for the hysteresis analysis unit 24 to manage the data.

Meanwhile, the system manager S supervises, in the hysteresis management device 23, the state of issuance of the coupon data CD for both the first IC card 40a and the second IC card 40b, that is, the request for acquisition of the coupon data CD. When the user purchases goods from the first reader/writer 35 or the second reader/writer 52, the coupon data CD may be collated by the hysteresis management device 23 managed by the system manager S, via the IC card management device 61, managed by the IC card management company M, in order to authenticate the coupon data. In case the coupon data CD has been authenticated, the hysteresis management device 23 transmits the results of authentication to the IC card management device 61. The IC card management device 61 and the first and second reader/writers 35, 62 here carries out assessing in such a manner as to reflect the contents of the coupon data CD.

Also, in case the reader/writer of the display terminal device 32a, 32b or 32c is connected on the network only with the hysteresis management device 23 managed by the system manager S, and goods have been purchased by the first reader/writer 35, data relevant to the above purchase event may be transmitted via the hysteresis management device 23 to the IC card management device 61.

Figure 14:
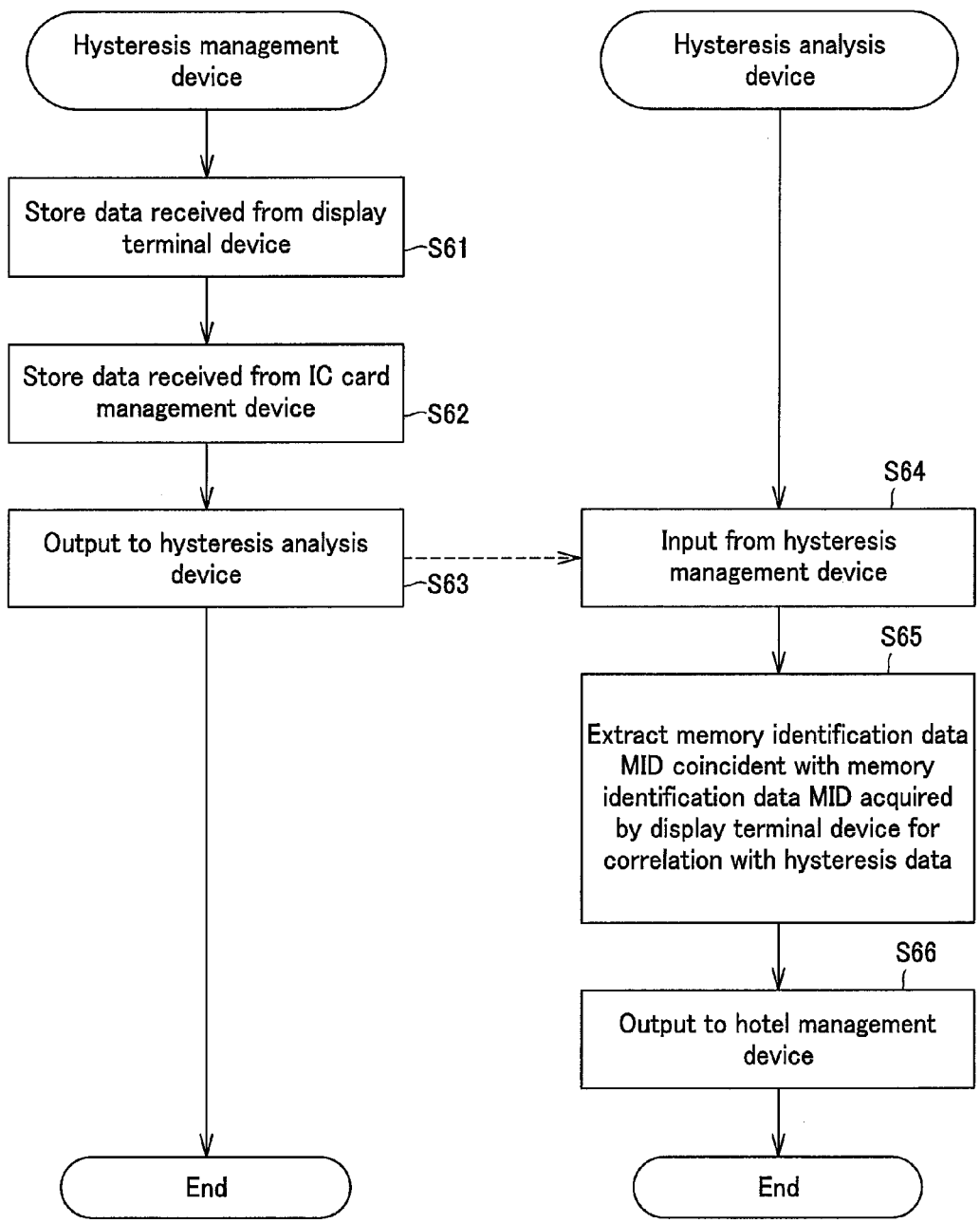
FIG. 14 is a flowchart showing a sequence of operations until generation of analysis data by a hysteresis analysis unit.

The sequence of operations until generation by the hysteresis analysis unit 24 of the analysis data D is now described with reference to FIG. 14.

Initially, in a step S61, hysteresis data are supplied from the display terminal device 32a, 32b or 32c to the hysteresis management device 23 so that the data supplied are stored in the database of the hysteresis management device. Specifically, the hysteresis management device 23 is supplied with the memory identification data MID of the first IC card 40a, transmitted from the display terminal device 32a, 32b or 32c in the above step S17, address data of the advertisement data, correlated thereto, the memory identification data MID of the electronic money zone 41, the membership data MD of the membership data zone 42, and with the second hysteresis data HD2. In a step S62, the hysteresis management device 23 is supplied with hysteresis data from the IC card management device 61. Specifically, the hysteresis management device 23 is supplied with the first hysteresis data HD1, correlated to the memory identification data MID, as managed by the IC card management device 61.

Thus, the totality of the hysteresis data of the first IC card 40a and the second IC card 40b is stored in the hysteresis management device 23. That is, there are stored in the hysteresis management device 23 the memory identification data MID, stored in the electronic money zone 41 of the first IC card 40a and the second IC card 40b, the first hysteresis data, the membership data MD of the membership data zone 42 and the second hysteresis data HD2, as shown in FIG. 6.

After lapse of a certain time duration, the hysteresis management device 23 in a step S63 outputs stored data to the hysteresis analysis unit 24. In a step S64, the hysteresis analysis unit 24 receives data input from the hysteresis management device 23. In the next step S65, the hysteresis management device 23 extracts the first hysteresis data HD1, which is associated with the memory identification data MID acquired by the store terminal device 51 installed in the IC card handling store A, and which is coincident with the memory identification data MID acquired on the display terminal device 32a, 32b or 32c installed in the hotel H. The hysteresis management device 23 then generates the analysis data D.

In the example of FIG. 7, the memory identification data MID [0003] and from the display terminal device 32a, 32b or 32c coincide with the memory identification data MID from the hysteresis management device 23. The hysteresis analysis unit 24 extracts the first hysteresis data HD1 ([BBB] and [FFF]), membership identification data MD ([H0002]) and the second hysteresis data HD2 ([YYY]) of the coincident memory identification data MID [0003], to generate analysis data D, as shown in FIG. 7(C). The hysteresis analysis unit 24 also extracts the first hysteresis data HD1 ([DDD] and [HHH]), membership identification data MD ([H0004]) and the second hysteresis data HD2 ([XYZ]) of the coincident memory identification data MID [0003], to process and generate the analysis data D.

The hysteresis analysis unit 24 in a step S66 outputs the analysis data D to the hotel management device 39. The hotel management device 39 browses and analyzes the analysis data D to analyze the behavior pattern of the users of the hotel H.

With the analysis data D, shown in FIG. 7(C), the hotel H is able to acquire the private information of the user, such as name, age and the address, from the membership data MD [H0002] associated with the memory identification data MID [0003]. The hotel is also able to know, from the second hysteresis data HD2 [YYY], which of the edited advertisement data ED has aroused the interest of the user. Moreover, from the first hysteresis data HD1 [BBB] and [FFF], the hotel is able to learn how far from the hotel H is the store the user visited and what goods the user purchased. In this manner, the hotel H is able to determine the contents of the relevant data RD generated by the hotel H or the contents of the second advertisement data AD2 and the third advertisement data AD3 included in the edited advertisement data ED. That is, the hotel H is able to know the users of the hotel and behavior patterns of the users who used the display terminal device 32a, 32b or 32c, as specified by the place identification data PID, based on the analysis data D. The advertisers B and C are within 500 m apart from the hotel H, however, if the presupposed behavior range of the users is broader than this, the advertisers B and C may be selected from a broader range.

In the foregoing, the data processing system 1, providing the hotel H with the analysis data D, is taken as an example for illustration. However, the present invention is not limited to this embodiment. For example, a plural number of the display terminal devices 32a to 32c may be provided in public spaces in e.g. a railroad station, and the analysis data D may be provided to the second advertiser B or the third advertiser C near the railroad station. This allows the second advertiser B or the third advertiser C to know the behavior hysteresis of the users of the display terminal devices 32a to 32c installed in the railroad station.

Meanwhile, a display terminal device 32d of a large picture image size may be provided in a public space, such as in a lobby of the hotel H, for many people to view the advertisement data simultaneously, whilst a display terminal device 32e of a small picture image size may be provided in each guest room for each hotel guest to view the data personally, as explained above with reference to FIG. 4. The display terminal device 32d of a large picture image size may be made a dedicated device for the advertisement terminal of the push type, without being provided with the first reader/writer 35. Even in such case, the log is recorded in the display terminal devices 32d, 32e, and the log data is transmitted to the hysteresis management device 23.

FIG. 15 shows an example of the log data. The display terminal device 32d of the large picture image size records log data shown in FIG. 15A and transmits the so recorded log data to the hysteresis management device 23. The display terminal device 32d of the large picture image size is not provided with the first reader/writer 35, as described above. Hence, the replay start time, replay end time and the number of times of repetition of each advertisement data are transmitted as log data to the hysteresis management device 23. These log data, shown in FIG. 15(A), represent check data indicating that advertisement has been made unanimously to the respective advertisers A to C.

FIG. 15(B) shows log data of the display terminal device 32e of the small picture image size. Since the display terminal device 32e of the small picture image size is provided with the first reader/writer 35, it supplies more detailed information such as use hysteresis of the IC card 40 or the state of acquisition of the coupon data CD. The display terminal device 32e of the small picture image size records the log data shown in FIG. 15(B) and transmits the data to the hysteresis management device 23. The log data of FIG. 15(B) represents purchase hysteresis including, in addition to the relay start time, replay end time and the number of repetitions, as in FIG. 15(A), the number of times the IC card 40 has been put over the reader/writer (hysteresis of actuations), coupon acquisition hysteresis from one memory identification data MID to the next, and the use/non-use of coupons from one memory identification data MID to the next. The analysis data D are generated in the hysteresis management device 23 based on the coupon acquisition hysteresis or on the purchase hysteresis.

When goods have been purchased in the display terminal device 32 or in the store terminal device 51, the hysteresis data HD1, HD2 are as shown in FIG. 16. That is, the hysteresis data includes the time/date of purchase of goods in relation with the memory identification data MID, that is, the time/date of the events of placing the IC card 40 over the first reader/writer 35 or the second reader/writer 52 for purchasing the goods, identification data for coupons used, and the hysteresis of value data VD (subtracted value, that is, the price of the goods, and the balance). In the embodiment of FIG. 16, identification data for coupons used in relation with the memory identification data MID, for example, is managed. It is therefor possible to comprehend the purchase hysteresis of goods from one memory identification data MID to the next and, for example to analyze the effect of issuance of the coupon data CD on the sale.

Figure 17:
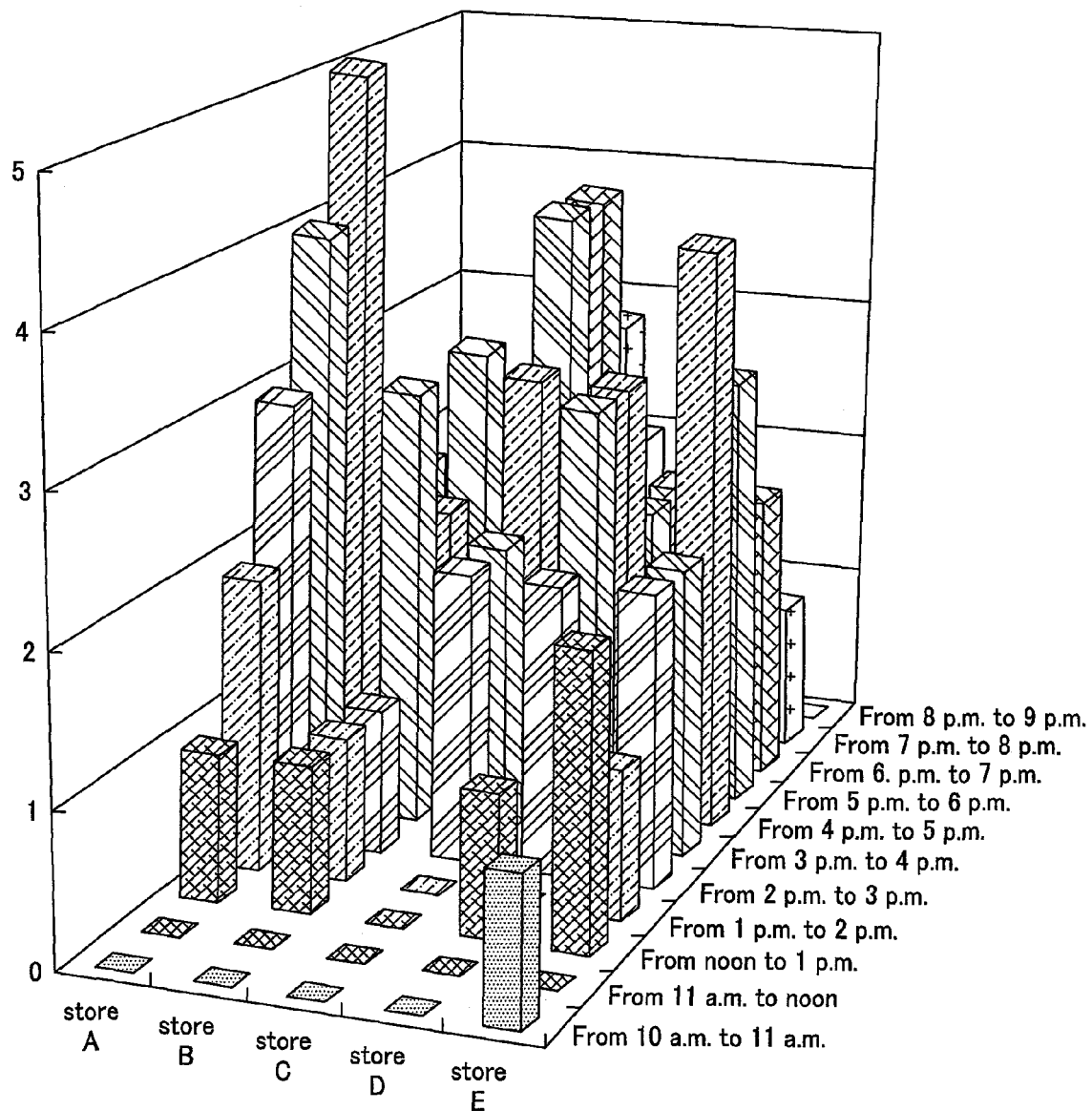
FIG. 17 is a schematic view showing analysis data that indicate the frequency of use of specified coupon data CD at plural stores from one time zone to the next.

The hysteresis analysis unit 24 may sum the above-described hysteresis data to generate the analysis data D shown for example in FIG. 17. In this figure, the frequency of use at each store of specified coupon data CD from one time zone to another is shown. It may be seen from this which specified coupon data CD is used often in which time zone, for instance.

The foregoing embodiment has been explained taking a system of a territory around the hotel H as an example. The present invention may be applied to a situation shown in FIG. 18 by enlarging the geographical range further. In the embodiment shown in FIG. 18, display terminal devices 32 are installed in a large size store LS and a convenience store CS within the precincts S of the railroad station. In respective places LS, S and CS for the display terminal devices 32, there are provided a plural number of large-sized display terminal device 32d and a plural number of small-sized display terminal devices 32e, as shown in FIG. 4. The convenience store CS is equivalent to the IC card handling store A of the above-described embodiment and is further provided with a store terminal device 51. The edited advertisement data ED and the advertisement data in each location are determined depending on these places LS, S or CS. That is, the large size store LS and the precincts S of the railroad station are equivalent to the hotel H of the previous embodiment and advertisement data of different types are displayed in dependence upon place types. Hence, the distributing device 22 is accessed at a time by many display terminal devices 32, thus significantly increasing the communication load. Thus, in the respective places LS, S and CS, a plural number of display terminal devices 32 are connected via LAN to a relay server 71. This relay server 71 is e.g. a proxy server and acts as a proxy for the display terminal devices 32 to download the advertisement data AD displayed on the display terminal devices 32. This relay server 71 and the distributing device 22 are interconnected via a network, such as WAN. The present embodiment presupposes that ca. 10,000 relay servers 71 are installed and that ca. 20 display terminal devices 32 are installed in each relay server 71.

The advertisement input terminal devices 10a to 10c of the advertisers A to C are also connected to the distributing device 22 and/or to the editing device 21, via networks, such as WAN, to provide the editing device 21 with the advertisement data.

Figure 18:
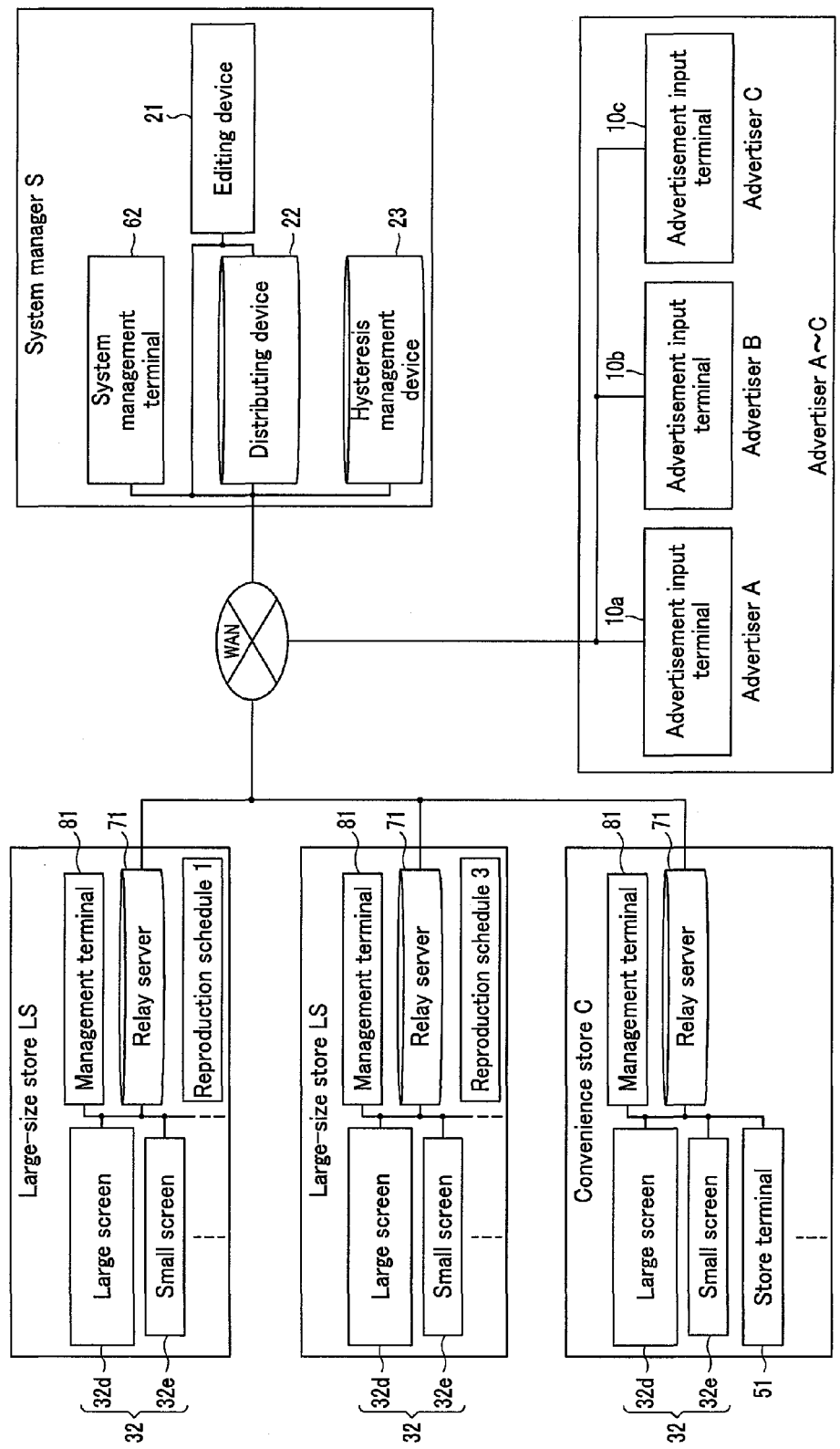
FIG. 18 is a schematic block diagram showing the constitution of a system in which display terminal units are provided in a large store, precincts of a railroad station and in a convenience store.
Figure 19:
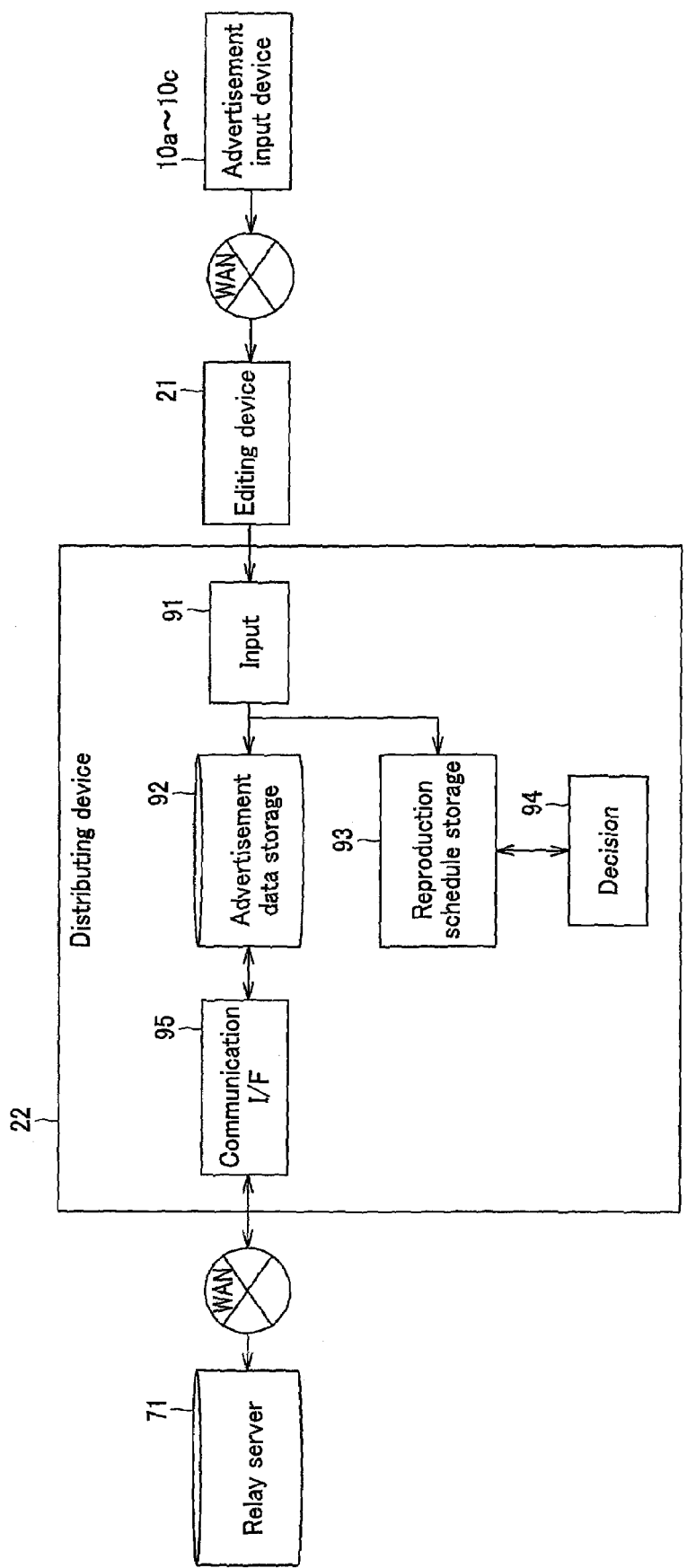
FIG. 19 is a block diagram showing the constitution of a distribution unit.

The distributing device 22, used in the system of FIG. 18, is now described with reference to FIG. 19. The distributing device 22 includes an input unit 91, to which are input first to third advertisement data AD1 to AD3 from the distributing device 22, and an advertisement data storage unit 92 in which to store the first to third advertisement data AD1 to AD3 supplied from the input unit 91. The distributing device 22 also includes a reproduction schedule storage unit 93 in which to store the reproduction schedule in the display terminal device 32 of the advertisement data stored in the advertisement data storage unit 92. The distributing device 22 further includes a decision unit 94 and a communication I/F 95. The decision unit 94 verifies whether or not the reproduction schedule stored in the reproduction schedule storage unit 93 has been changed, and the communication I/F 95 communicates with the large-sized store LS, precincts of the railroad station S and the convenience store CS via a network, such as LAN.

The input unit 91 is e.g. a communication I/F, and is supplied from the editing device 21 with a variety of advertisement data edited by the editing device 21 and with a reproduction schedule for the advertisement data.

Figures 20A, 20B:
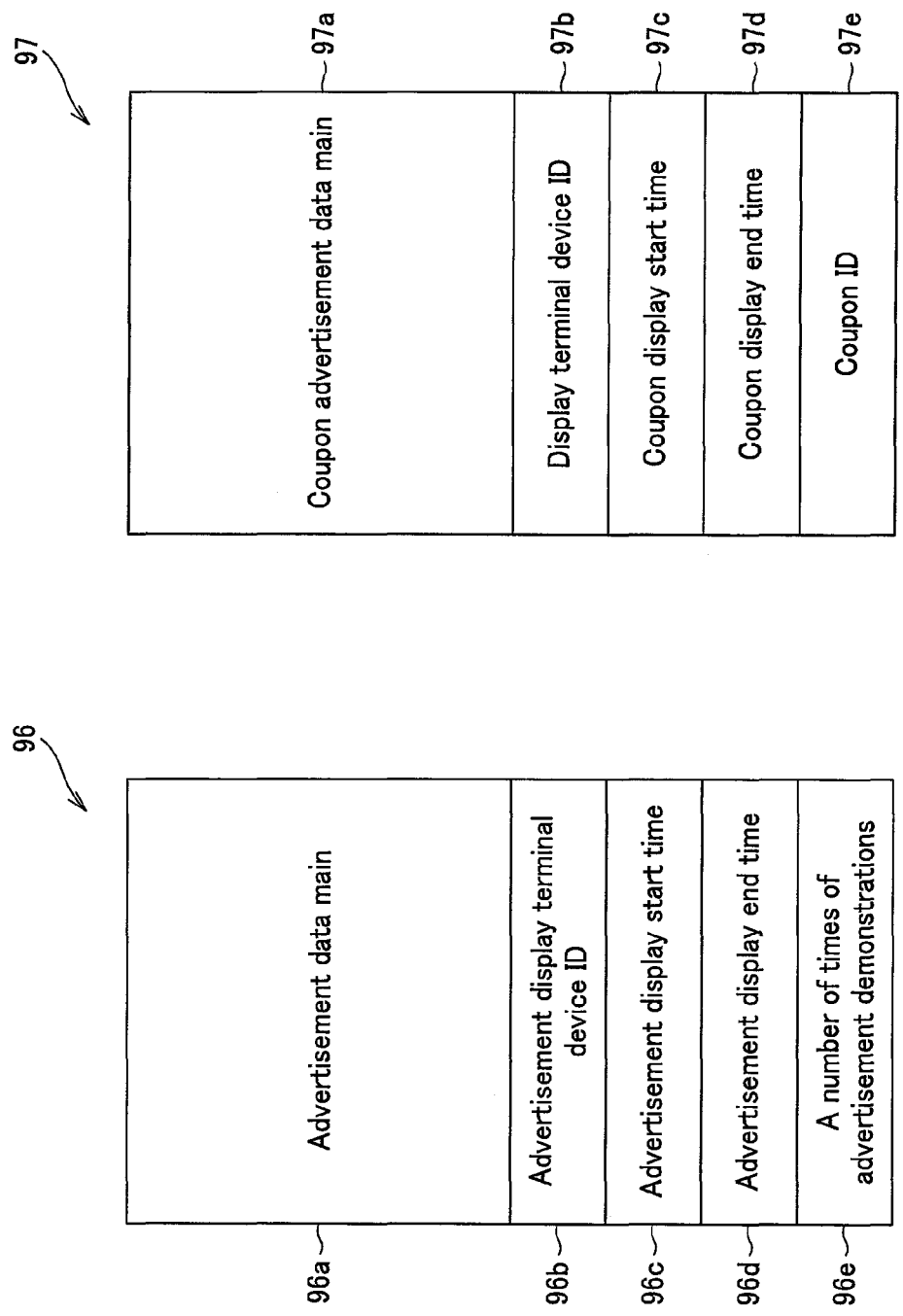
FIGS. 20(A) and 20(B) are diagrammatic views showing the constitution of distributed advertisement data, where

Referring to FIG. 20, the advertisement data supplied to the input unit 91 and stored in the advertisement data storage unit 92 is now described. Referring to FIG. 20(A), advertisement data 96, free of the coupon data CD, and which are distributed to the display terminal device 32d of the large picture image size, not having the reader/writer function for the IC card 40, is made up of advertisement data main 96a, an ID 96b for the display terminal device 32d of the large picture image size, an advertisement display start time 96c, an advertisement display end time 96d and a number of times of advertisement demonstrations 96e. Of these advertisement data 96, the ID 96b for the display terminal device 32d of the large picture image size, advertisement display start time 96c, advertisement display end time 96d and the number of times of advertisement demonstrations 96e make up a reproduction schedule. These advertisement data 96, generated by the editing device 21, are stored in the advertisement data storage unit 92.

Referring to FIG. 20(B), advertisement data 97, containing the coupon data CD, and which are distributed to the display terminal device 32e of the small picture image size, are made up of advertisement data main 97a, including the coupon data CD, an ID 97b for the display terminal device 32e of the small picture image size, advertisement display start time 97c, containing the coupon, advertisement display end time 97d, containing the coupon, and an ID 97e of the coupon data CD contained in the advertisement data. The advertisement data 97 may further include the number of times of advertisement demonstrations 96e. Of these advertisement data 97, the ID 97b for the display terminal device 32e of the small picture image size, advertisement display start time 97c, containing the coupon, advertisement display end time 97d, containing the coupon, and an ID 97e of the coupon data CD contained in the advertisement data make up the reproduction schedule. The advertisement data 97, generated in the editing device 21, are stored in the advertisement data storage unit 92.

The advertisement data, stored in the advertisement data storage unit 92, may only be the advertisement data main 96a and 97a of the advertisement data 96 and 97 shown in FIGS. 20(A) and 20(B). In this case, the reproduction schedule, such as the reproduction time of the advertisement data main 96a and 97a, becomes indefinite. In such case, the reproduction schedule of the advertisement data main 96a and 97a are stored from the editing device 21 via input unit 91 in the reproduction schedule storage unit 93.

The reproduction schedule, stored in the reproduction schedule storage unit 93, is configured as shown for example in FIG. 21. A reproduction schedule 98, shown in FIG. 21, is a reproduction list of a plural number of the advertisement data, constituted by a URL (Uniform Resource Locator) indicating the location of each advertisement data, advertisement display start time and advertisement display end time. The reproduction schedule 98, in the form of the reproduction list, is formulated in the editing device 21, and is stored via the input unit 91 in the reproduction schedule storage unit 93.

The advertisement data, displayed in the display terminal device 32, is not the same for all time but is updated once a day, a week or a month. Thus, the distributing device 22 is provided with the decision unit 94 to verify whether or not there has been any change in the reproduction schedule 98 stored in the reproduction schedule. In case there has been any change in the reproduction schedule, the distributing device 22 announces such change to the relay server 71 and to the display terminal devices 32 beyond.

The communication I/F 95 communicates with the relay server 71 in accordance with a network protocol, such as TCP/IP (Transmission Control Protocol/Internet protocol). The communication I/F 95 periodically confirms the status of the relay server 71 and the status of the display terminal device 32 connected via LAN to the relay server 71. In the course of the sequence of operations, the advertisement data 96, 97 shown in FIG. 20 and the reproduction schedule 98 shown in FIG. 21 are distributed to the relay server 71. Further, the communication I/F 95 monitors the communication load, that is, the number of the relay servers 71 being accessed. In distributing the advertisement data 96, 97 shown in FIG. 20 and the reproduction schedule 98 shown in FIG. 21, the advertisement data 96, 97 shown in FIG. 20 and the reproduction schedule 98 shown in FIG. 21 are distributed only when the communication load is smaller than a predetermined value.

Figure 22:
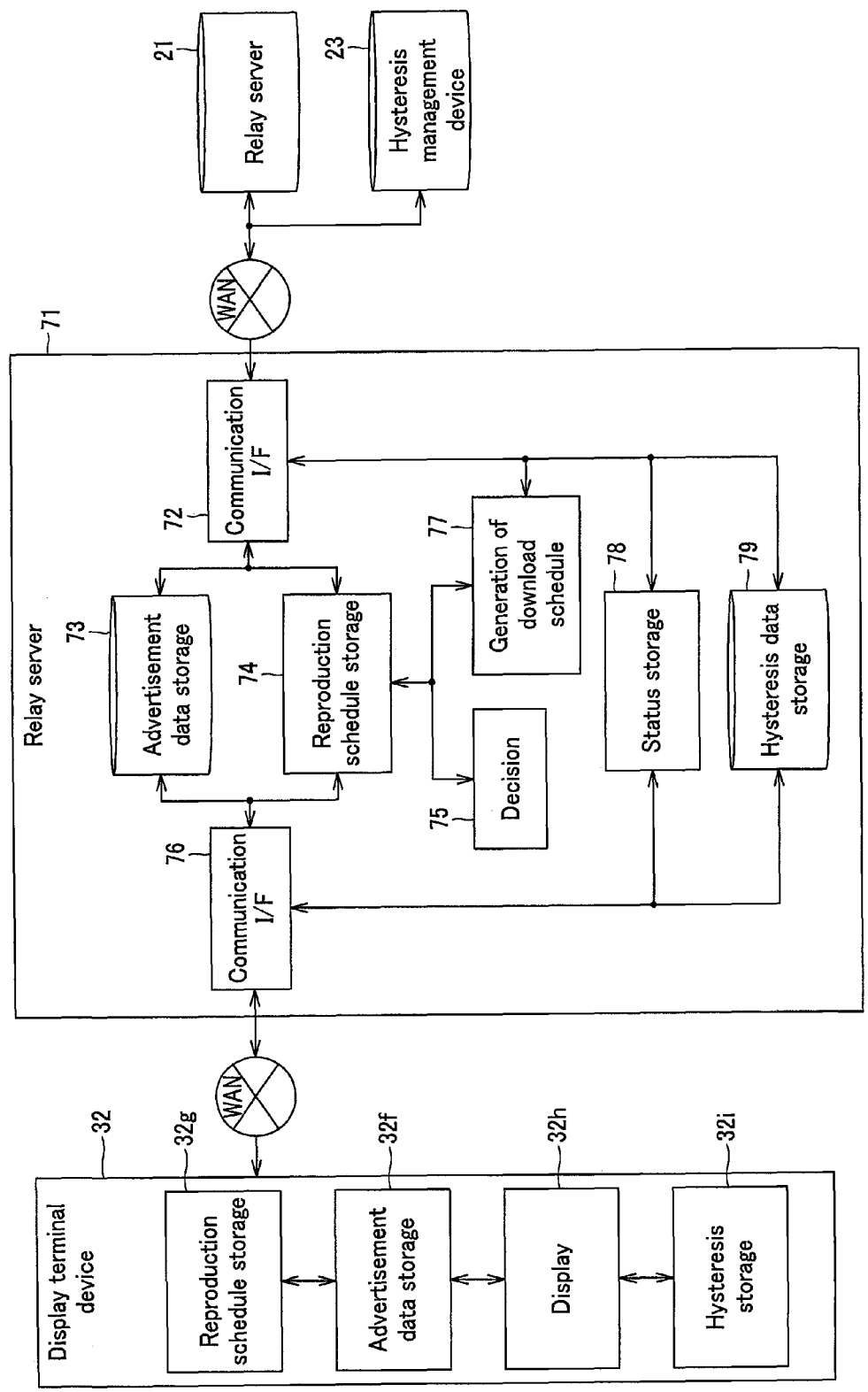
FIG. 22 is a block diagram showing a relay server provided at a front end of each place of installation.

Referring to FIG. 22, the constitution of the relay server 71, arranged at the front ends of the places LS, S or CS, is now described.

In FIG. 22, the relay server 71 includes a communication I/F 72, communicating with the distributing device 22 via a network, such as WAN, and an advertisement data storage unit 73 for storing the display terminal device 32. The relay server also includes a reproduction schedule storage unit 74 for storing the reproduction schedule transmitted from the distributing device 22, a decision unit 75 for verifying whether or not there has been any change in the reproduction schedule stored in the reproduction schedule storage unit 74, and a communication I/F 76 for distributing e.g. advertisement data to the display terminal device 32 via e.g. LAN. The relay server also includes a download schedule generating unit 77 for generating the schedule that downloads advertisement data from the distributing device 22 in accordance with the reproduction schedule 98 stored in the reproduction schedule storage unit 74. The relay server further includes a status storage unit 78 in which to store the status of the display terminal device 32 and a hysteresis data storage unit 79 in which to store hysteresis data in the display terminal device 32.

The communication I/F 72 periodically transmits the status of the display terminal device 32, along with the own status, to the distributing device 22 via a network, such as WAN. The communication I/F 72 also downloads advertisement data from the distributing device 22 in accordance with the download schedule generated in the download schedule generating unit 77.

The advertisement data, displayed in the display terminal device 32, is stored in the advertisement data storage unit 73. The display terminal device 32 has an advertisement data storage unit 32f, as shown in FIG. 22. However, the storage capacity of the display terminal device 32 is not so large as that of the relay server 71. Hence, a preset amount of the advertisement data is downloaded from the advertisement data storage unit 73 so as to be displayed in a display 32h of the display unit 33, for instance. The advertisement data stored in the advertisement data storage unit 73 is the advertisement data displayed in the display terminal device 32 and furnishes preset advertisement data to the display terminal device 32 in accordance with the reproduction schedule of the advertisement data 96, 97 shown in FIG. 20 or with the reproduction schedule 98 shown in FIG. 21.

The reproduction schedule, stored in the reproduction schedule storage unit 93, is shown in FIG. 21, and has been transmitted by the distributing device 22. The decision unit 75 verifies whether or not there has been any change in the reproduction schedule 98 stored in the reproduction schedule storage unit 93. If there has been any change, such change is announced to the display terminal device 32. The display terminal device 32 includes a reproduction schedule storage unit 32g, as shown in FIG. 22. The latest reproduction schedule 98 is stored for all time in the reproduction schedule storage unit 32g, and the advertisement data is displayed in accordance with this reproduction schedule 98.

In case the advertisement data contains the reproduction schedule, as shown in FIG. 20, the decision unit 75 accesses the advertisement data storage unit 73 to verify whether or not there has been any change in the reproduction schedule.

The communication I/F 76 communicates with each display terminal device 32 via a network which is based on TCP/IP. At this time, the communication I/F 76 periodically checks for the status of the display terminal device 32 and, during this sequence of operations, the display terminal device 32 downloads the advertisement data 96, 97 shown for example in FIG. 20 or the reproduction schedule 98 shown in FIG. 21. The communication I/F 76 also checks for the communication load, that is, the number of the accessing display terminal devices 32, for all time, in order to enable the display terminal device 32 to download the advertisement data 96, 97 in the advertisement data storage unit 73 shown in FIG. 20, or the reproduction schedule 98 stored in the reproduction schedule storage unit 74, shown in FIG. 21, only in case the communication load is smaller than a preset value.

The download schedule generating unit 77 assembles a download schedule for advertisement data stored in the advertisement data storage unit 73, based on a reproduction schedule for the advertisement data 96, 97 shown in FIG. 20 or a reproduction list stored in the reproduction schedule storage unit 74. The download schedule generating unit 77 maps out a plan for downloading beginning from the advertisement data scheduled to be reproduced first out of the advertisement data stated in the reproduction list. The communication I/F 72 sequentially downloads the advertisement data from the distributing device 22 in accordance with the generated download schedule.

The status storage unit 78 temporally saves a status notification of the display terminal device 32, transmitted from the display terminal device 32, in order to transmit the status of the display terminal device 32 to the distributing device 22. The status notification of the display terminal device 32 records e.g. the residual memory storage capacity of the display terminal device 32 and the statuses such as troubles in the operating unit 34, display unit 33 or in the first reader/writer 35. The relay server 71 transmits the status of the display terminal device 32 to the distributing device 22 in order for the system manager S to grasp the status of the display terminal device 32. This enables the system manager S to be informed that advertisement has been done reliably. The communication I/F 72 sends to the distributing device 22 the status of the relay server 71 as well as the status of the display terminal device 32.

The hysteresis data storage unit 79 records log data of FIGS. 15 and 16, transmitted from the display terminal devices 32, and transmits these log data to the hysteresis management device 23 via the communication I/F 72 at predetermined intervals. In more detail, the display terminal device 32 transmits the first hysteresis data HD1 and the second hysteresis data HD2, stored in the display terminal devices 32, to the relay server 71, as shown in FIG. 22, for the relay server 71 to store these data in the hysteresis data storage unit 79.

Thus, the relay server 71 stores the advertisement data in its advertisement data storage unit 73, from which the display terminal device 32 downloads the advertisement data as necessary. Hence, the display terminal device 32 does not have to directly access the distributing device 22, thus diminishing the communication load of the distributing device 22. Moreover, since the download schedule generating unit 77 downloads the advertisement data to the advertisement data storage unit 73 in accordance with the reproduction schedule 98, the relay server 71 does not have to access the distributing device 22 at a time, thus further diminishing the communication load. More specifically, the advertisement data are distributed via WAN which is not stable in its rate of communication. However, with the present system, in which there occurs no congested state in the distributing device 22, advertisement data may be reliably displayed on the display terminal devices 32.

Figure 23:
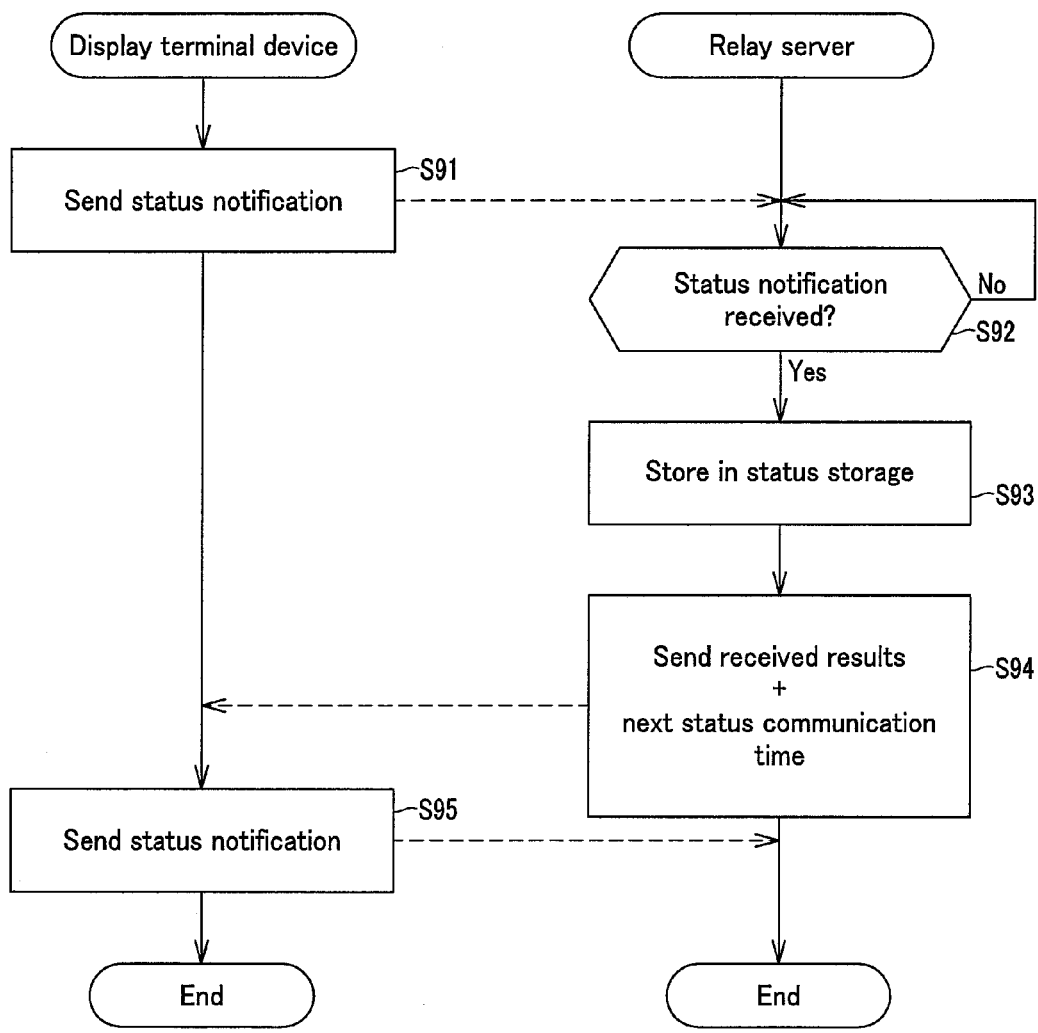
FIG. 23 is a flowchart showing the sequence of operations until storage of the status of the display terminal unit at the relay server.

The sequence of operations until the status of the display terminal device 32 is stored in the relay server 71 is now described with reference to FIG. 23. This is to report the operating state of the display terminal device 32 to the system manager S that is supervising the distributing device 22.

In a step S91, the display terminal device 32 checks for the operating states of the first reader/writer 35, shortage in capacity of a memory for saving the advertisement data, and the status, such as possible troubles, non-periodically or for all time, and notifies the status, thus confirmed, to the relay server 71.

If the status notification is received in a step S92 by the communication I/F 76, the relay server 71 in a step S93 stores the status notification, thus received, in the status storage unit 78. The relay server 71 in a step S94 transmits, from its communication I/F 76, the received results of the status notification and the time of the next status notification to the display terminal device 32. Thus, the display terminal device 32 reports the status to the relay server 71 for all time or non-periodically.

Figure 24:
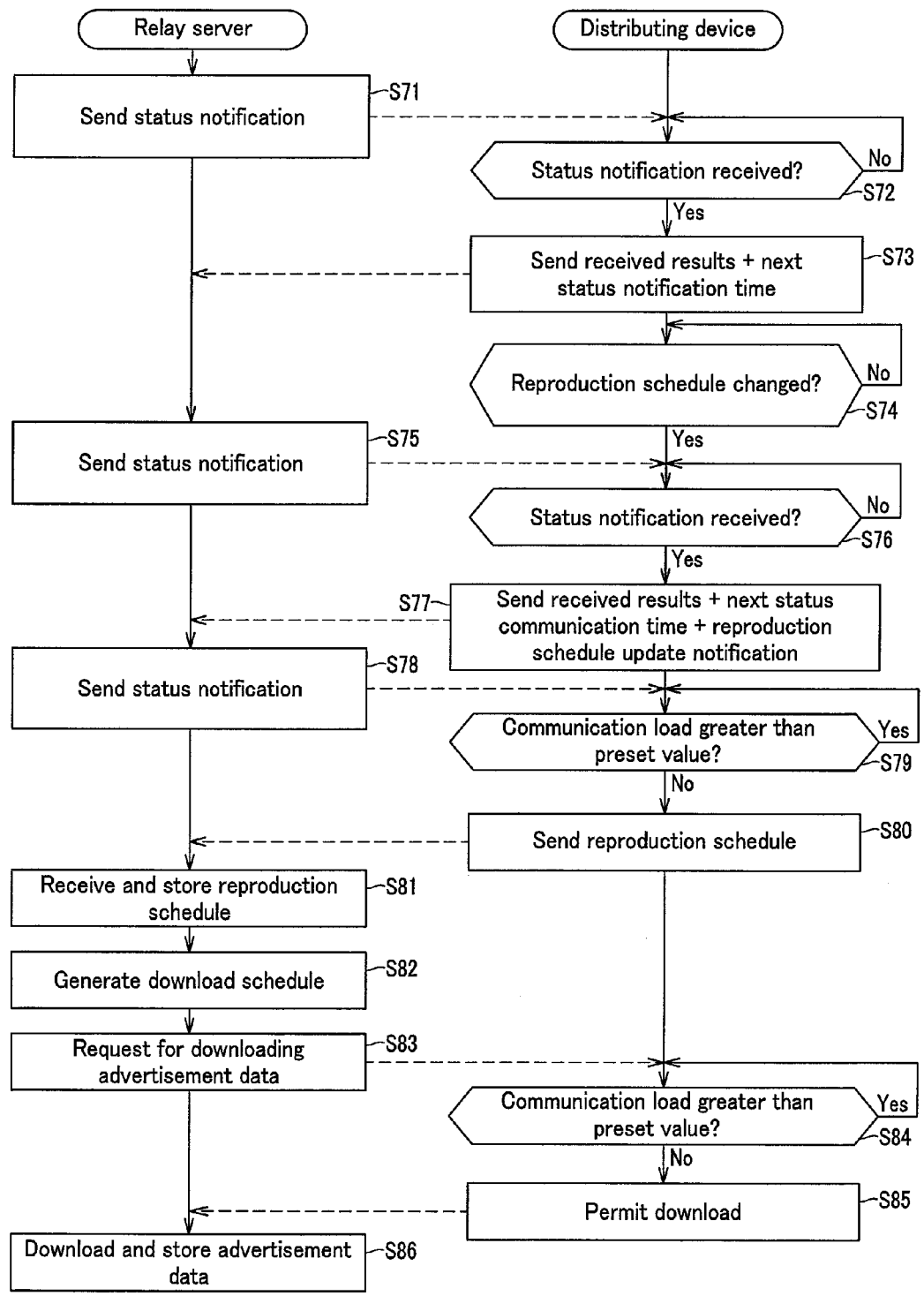
FIG. 24 is a flowchart showing the sequence of operations for exchanging reproducing schedules and advertisement data between the distributing unit and the relay server.

The sequence of operations of exchanging the reproduction schedule and the advertisement data between the distributing device 22 and the relay server 71 is now described with reference to FIG. 24.

In a step S71, the relay server 71 periodically transmits a status notification from its relay server 71 via communication I/F 72 to the distributing device 22. The relay server 71 causes the status information on e.g. the capacity shortage in the memory of the display terminal device 32 stored in the status storage unit 78, or the troubles in the reader/writer functions of the IC card 40, to be included, in addition to e.g. the error information of the memory capacity shortage in the own advertisement data storage unit 73, in the status notification, and transmits the resulting status notification as a sole status notification to the distributing device 22.

If, in a step S72, the distributing device 22 detects in its communication I/F 95 that the status notification from the relay server 71 has been received, the distributing device in a step S73 transmits the tenor of receipt of the status notification and the information on the time of the next status notification via its communication I/F 95.

In a step S74, the distributing device 22 verifies, in its decision unit 94, whether or not a new reproduction schedule of advertisement data has been entered from the editing device 21 and whether or not the reproduction schedule has been changed. If there has been any change, the distributing device 22 proceeds to a step S76.

When the time is the time of the next status notification, the relay server 71 in a step S75 transmits a status notification, similar to that in the step S71, from its communication I/F 72 to the distributing device 22. In a step S76, the distributing device 22 verifies whether or not the status notification transmitted from the relay server 71 has been received. If the status notification has been received, the distributing device 22 proceeds to a step S77.

In this step S77, the distributing device 22 transmits, from the communication I/F 95, a notification on the updated reproduction schedule, in addition to the tenor of receipt of the status notification and the information on the time of the next status notification.

On receipt of a reproduction schedule update notification from the distributing device 22, by the communication I/F 72, the relay server 71 in a step S78 transmits a request for acquisition of the reproduction schedule, via communication I/F 72, to the distributing device 22, in order to acquire the reproduction schedule.

This request for acquisition of the reproduction schedule may also be made simultaneously with the status notification.

In a step S79, the distributing device 22 for all time verifies whether or not the communication load is larger than a predetermined value. Specifically, the distributing device 22 verifies whether or not the number of the relay servers 71 accessing the communication I/F 95, is larger than a threshold value. When the communication load is smaller than the preset value, the distributing device 22 in a step S80 transmits, from its communication I/F 95, the as-updated reproduction schedule 98 to the relay server 71.

On receipt of the as-changed reproduction schedule 98, by the communication I/F 72, the relay server 71 in a step S81 gets the reproduction schedule 98 stored in the reproduction schedule storage unit 74.

In the foregoing, the case of exchanging the reproduction schedule 98 is taken as an example for description. If the reproduction schedule is one with the advertisement data, as shown in FIG. 20, the advertisement data 96, 97 of FIG. 20 are transmitted at the time of transmitting the reproduction schedule 98.

In a step S82, the relay server 71 generates a download schedule of advertisement data, conforming to the as-changed reproduction schedule 98, by the download schedule generating unit 77 referencing the reproduction schedule 98 of the reproduction schedule storage unit 74.

Specifically, the download schedule generating unit 77 assembles a download schedule for advertisement data stored in the advertisement data storage unit 73, based on a reproduction schedule for the advertisement data 96, 97 shown in FIG. 20 or with a reproduction list stored in the reproduction schedule storage unit 74. The download schedule generating unit 77 maps out a plan for downloading beginning from the advertisement data scheduled to be reproduced first out of the advertisement data stated in the reproduction list.

When the time is the time prescribed in the download schedule, the relay server 71 in a step S83 transmits a download request to the distributing device 22. Here again, the distributing device 22 checks to see whether or not the communication load is larger than a preset value, as in the step S79. When the communication load is not larger than a preset value, the distributing device 22 in a step S85 performs the processing of complying with the download request by the relay server 71. That is, the relay server 71 downloads the advertisement data complying with the download request. In a step S86, the relay server 71 gets the downloaded advertisement data sequentially stored in an advertisement data storage unit 86.

Figure 25:
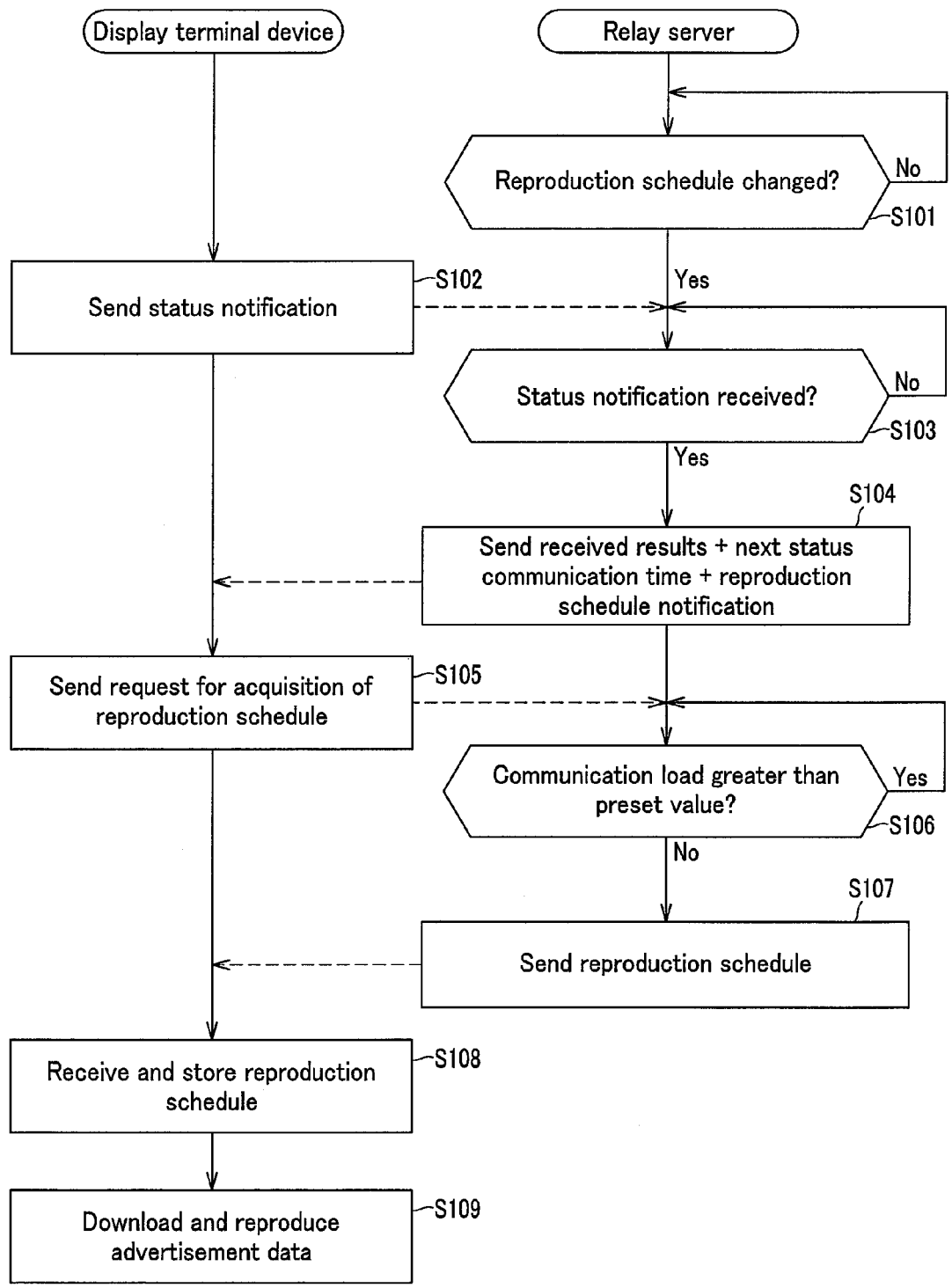
FIG. 25 is a flowchart showing the sequence of operations for exchanging reproducing schedules and advertisement data between the relay server and the distributing unit.

The sequence of operations for exchanging the reproduction schedule and the advertisement data between the relay server 71 and the display terminal device 32 is now described with reference to FIG. 25.

In a step S101, the relay server 71 verifies, by its decision unit 75, whether or not the currently stored reproduction schedule 98 has been changed, based on the reproduction schedule 98, transmitted from the distributing device 22. If the reproduction schedule has been changed, the relay server 71 shifts to a step S103.

On the other hand, the display terminal device 32 in a step S102 periodically transmits the status communication to the relay server 71, as in the step S91 above. In a step S103, the relay server 71 verifies whether or not the status notification from the display terminal device 32 has been received by its communication I/F 76. If the notification has been received, it is stored in a step S104 in the status storage unit 78. The relay server 71 also transmits a reproduction schedule update notification, in addition to the information on the tenor of receipt of the status notification and the time of next status notification, to the display terminal device 32 from the communication I/F 76.

On receipt of the reproduction schedule update notification, transmitted from the relay server 71, the display terminal device 32 transmits a request for acquisition of a reproduction schedule to the relay server 71, in order to acquire the as-changed reproduction schedule in a step S105. This request for acquisition of the reproduction schedule may also be made along with the status notification.

In a step S106, the relay server 71 for all time verifies whether or not the communication load is larger than a predetermined value. When the communication load is smaller than the preset value, the relay server 71 in a step S107 transmits the as-updated reproduction schedule 98 to the display terminal device 32 from its communication I/F 76.

On receipt of the as-changed reproduction schedule 98, by the communication I/F 72, the display terminal device 32 in a step S108 gets the reproduction schedule 98 stored in the reproduction schedule storage 32g. The display terminal device 32 sequentially downloads the advertisement data from the advertisement data storage unit 73 of the relay server 71 in accordance with the reproduction schedule stored in the reproduction schedule storage 32g to display the advertisement data on a display unit 32b.

It should be noted that, if a given advertisement data is being reproduced, the display terminal device 32 downloads advertisement data, reproduced next, from the relay server 71, saves the so downloaded advertisement data in the advertisement data storage 32f, in readiness for reproduction of the next advertisement data.

Figure 26:
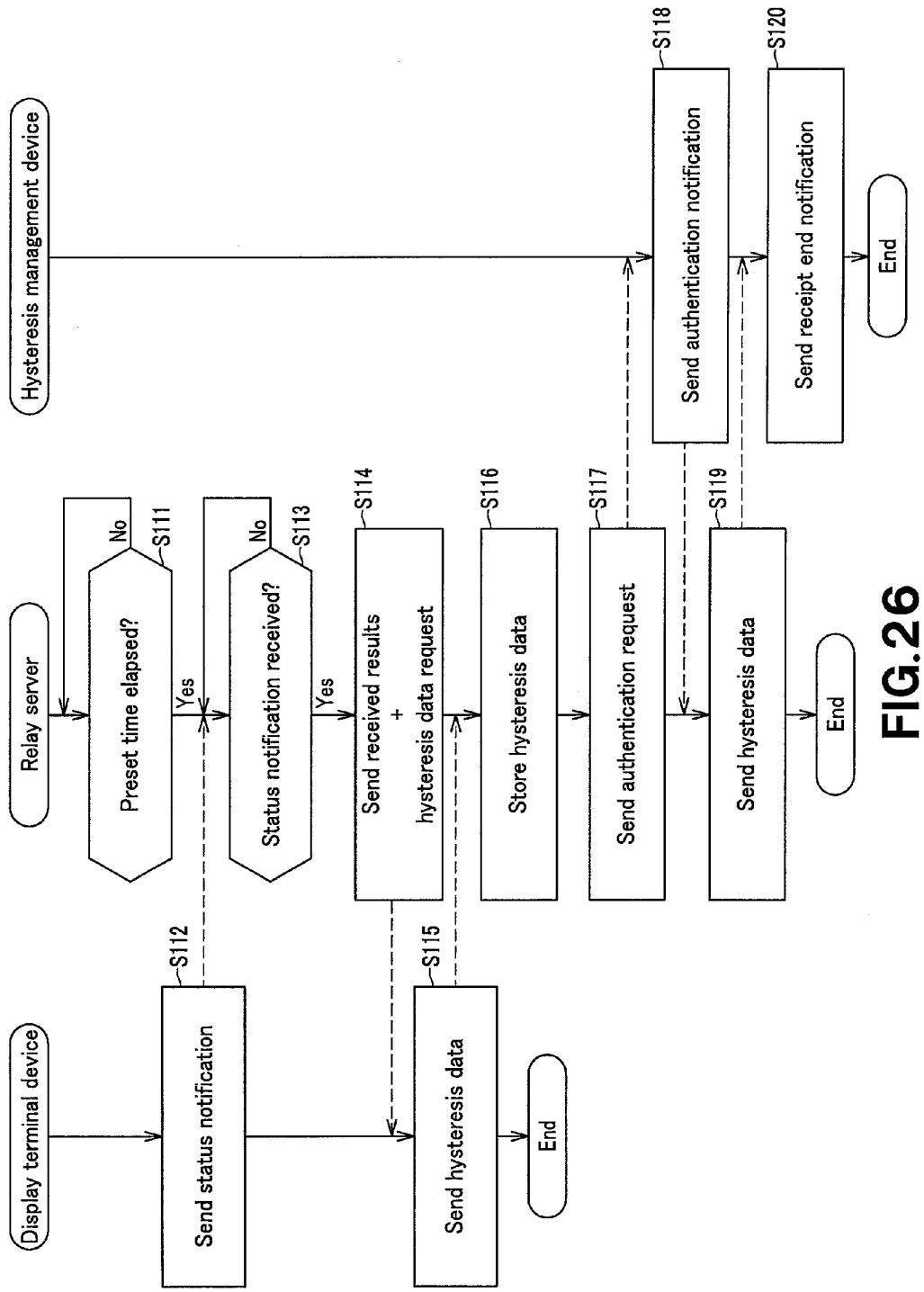
FIG. 26 is a flowchart showing a sequence of operations until the hysteresis data stored in the display terminal unit is transmitted via a relay server to a hysteresis management unit managed by the display terminal unit.

Referring to FIG. 26, the sequence of operations until hysteresis data stored in the display terminal device 32 is transmitted via the relay server 71 to the hysteresis management device 23, supervised by the system manager S, is now described.

In a step S111, the relay server 71 verifies whether or not the preset time for recovery of the hysteresis data HD1, HD2 of the display terminal device 32, such as 15 minutes, 30 minutes, one hour or one day, has elapsed. When this preset time has elapsed, the mode is that for recovery of the hysteresis data.

In a step S112, the display terminal device 32 periodically transmits the status notification to the relay server 71. The relay server 71 in a step S113 verifies, by its communication I/F 76, whether or not the status notification from the display terminal device 32 has been received. If the status notification has been received, the relay server 71 in a step S114 gets the status notification stored in the status storage 78. The relay server also transmits, from its communication I/F 76, the request for acquisition of the hysteresis data, stored in a hysteresis storage unit 32i of the display terminal device 32, in addition to the information on the tenor of receipt of the status notification and on the time of the next status notification.

On receipt of the acquisition request of the hysteresis data, transmitted from the relay server 71, the display terminal device 32 in a step S115 reads out hysteresis data stored in the hysteresis storage 32i to transmit the so read out data to the relay server 71. The relay server in a step S116 causes the hysteresis data, received at the communication I/F 76, to be stored in the hysteresis data storage unit 79.

The case where the relay server 71 transmits the hysteresis data to the hysteresis management device 23 is now described. This processing is carried out e.g. once a day. Initially, in a step S117, the relay server 71 sends an authentication request, via its communication I/F 72, to the hysteresis management device 23.

The reason is that, since the communication route between the relay server 71 and the hysteresis management device 23 is WAN that exploits the public network, so that data may illegally be acquired by a third party, it is necessary to carry out authentication before exchanging the hysteresis data. In a step S118, the hysteresis management device 23 receives an authentication request, sent from the relay server 71. In case the authentication of the relay server 71 is acquired, an authentication notification is transmitted to the relay server 71. By so doing, the relay server 71 has been authenticated by the hysteresis management device 23.

In the next step S119, the relay server 71 reads out hysteresis data from the hysteresis data storage unit 79 to transmit the data via the communication I/F 72 to the hysteresis management device 23. In a step S120, the hysteresis management device 23 transmits a notification on the end of receipt of the hysteresis data to the relay server 71. This notification on the end of receipt may also be transmitted via relay server 71 to the display terminal device 32. By so doing, the hysteresis management device 23 may acquire hysteresis data at the display terminal device 32 to generate analysis data.

Meanwhile, a network, such as WAN, is used to interconnect the distributing device 22 and the front ends of the places LS, S and CS, with the aid of a public network, as shown in FIG. 18. Thus, the network is made secure, with the use of SSL, for instance. In addition, a similar network, such as WAN, is used to interconnect the distributing device 22 and the editing device 21 on one hand and the first to third advertisement input units 10a to 10c on the other. Hence, the network is again made secure, with the use of SSL, for instance. Moreover, it is LAN that takes over the interconnection between the relay server 71 and the display terminal device 32. This interconnection is a public space exploited by a large number of indefinite parties. For this reason, this interconnection between the relay server 71 and the display terminal device 32 is also made secure with SSL, for instance. That is, the system shown in FIG. 18 exploits SSL for the network between the respective units to prevent illegal data acquisition by a third party by so-called impersonation.

Figure 27A:
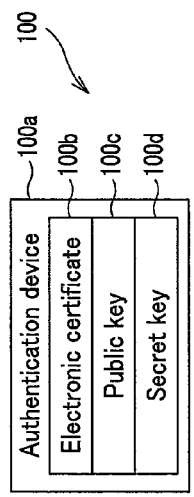
FIGS. 27(A) and 27(B) are schematic views showing the processing for authentication carried out between first and second units, where

Referring to FIG. 27, the authentication processing by SSL for carrying out transfer of data, such as advertisement data, is now described. It should be noted that first and second devices, described here, are units shown in FIG. 18. Depending on the sorts of transmitted data, the distributing device 22 and the editing device 21 on one hand and the relay server 71 and the display terminal device 32 on the other become first and second devices, respectively.

The first device 101 and the second device 102 may be mounted on board. However, an authentication device 100 is externally mounted. The authentication device 100 includes a secure ROM 100a with ensured uniqueness, as shown in FIG.

27(A). In this ROM 100a, there are stored an electronic certificate 100b, a public key 100c and a secret key 100d, which are data in PKI (Public Key Infrastructure) as data proper to the system. The public key and the secret key are paired data related to each other such that data encrypted by one of the keys cannot be decoded except with the other key and that one of the keys cannot be determined from the other key.

Figure 27B:
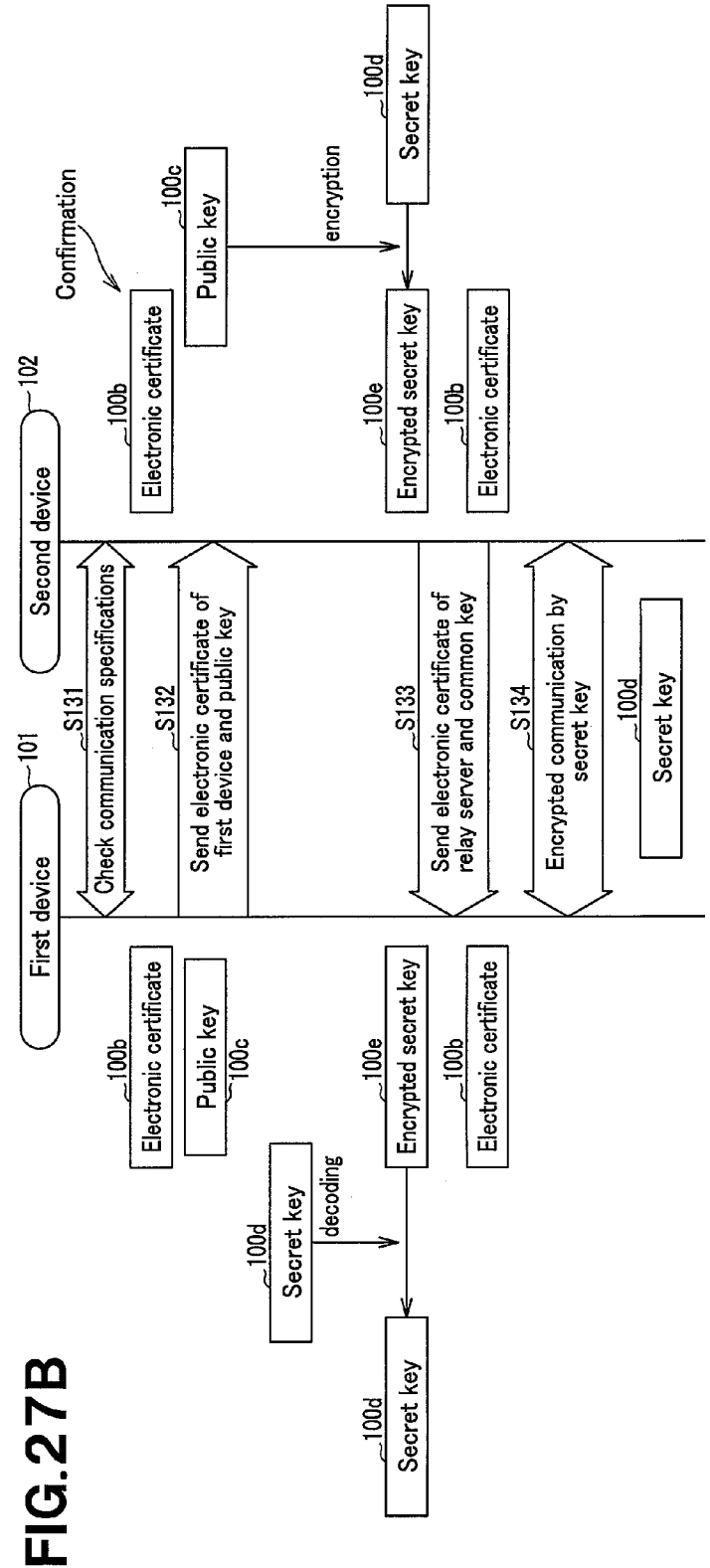

Referring to FIG. 27(B), when the second device 102 acquires e.g. advertisement data from the first device 101, specifications relevant to the SSL communication are confirmed in a step S131 by the first device 101 and the second device 102. Then, in a step S132, the first device 101 sends an electronic certificate 100b and a public key 100c, stored in the authentication device 100 of the first device 101, to the second device 102.

The second device 102 confirms the electronic certificate 100b received to confirm that the sending party is the first device 101, as a counterpart of communication. The second device then encrypts the own key, that is, a secret key 100d, stored in the authentication device 100 of the second device 102, using the transmitted public key 100c, to generate an encrypted secret key 100e. The second device 102 in a step S133 transmits the encrypted secret key 100e generated and the electronic certificate 100b of the authentication device 100 of the second device 102 to the first device 101.

The first device 101 confirms the electronic certificate 100b received to authenticate that the counterpart of communication is the second device 102. The first device 101 then decodes the transmitted encrypted secret key 100e, using the secret key 100d, stored in the authentication device 100 of the first device 101, to generate a secret key 100d of the second device 102. Thus, the second device 102 and the first device 101 may acquire a common secret key 100d, using encrypted communication, and may conduct data communication for e.g. advertisement data, with the use of the secret key 100d.

FIG. 28(A) shows the processing for distributing the reproduction schedule from the distributing device 22 to the relay server 71, using the SSL.

For transmitting the reproduction schedule from the distributing device 22 to the relay server 71, result data obtained in a step S141 on hash calculation of the reproduction schedule in the distributing device 22 is encrypted in a step S142 with the secret key 100d. The encrypted reproduction schedule is electronically signed in a step S143. In a step S144, the resulting reproduction schedule is sent, along with the data encrypted with the secret key, to the relay server 71. In a step S144, the reproduction schedule is sent, along with the encrypted data, to the relay server 71.

In a step S145, the relay server 71 decodes the received encrypted reproduction schedule with the secret key 100d to generate the reproduction schedule in a step S146. In the next step S147, hash calculations are carried out on the so generated data to generate result data. The relay server 71 decodes the electronically signed reproduction schedule, received from the distributing device 22 in a step S148, with the secret key 100d, in a step S149, to generate decoded data in a step S150. The result data of the hash calculation, obtained in the step S144, should be coincident with the decoded data of the step S150 except if substitution or garbage has occurred in the course of the communication. These may be compared/verified to ensure safety of the communication path.

FIG. 28(B) shows the processing for distributing the advertisement data from the distributing device 22 to the relay server 71.

When the advertisement data is transmitted from the distributing device 22 to the relay server 71, the result data obtained on hash calculation of the advertisement data in a step S151 in the distributing device 22 is encrypted in a step S152 by the secret key 100d. The encrypted advertisement data is electronically signed in a step S153 and sent to the relay server 71 along with the data encrypted in a step S154 with the secret key 100d.

The relay server 71 in a step S155 decodes the received encrypted advertisement data with the secret key 100d to generate advertisement data in a step S156. In a step S157, hash calculation is conducted on this data to generate result data. The relay server 71 in a step S159 decodes, with the secret key 100d, the electronically signed advertisement data received in a step S158 from the distributing device 22, to generate decoded data in a step S160. The result data of the hash calculation, obtained in the step S154, should be coincident with the decoded data of the step S160 except if substitution or garbage has occurred in the course of the communication. These may be compared/verified to ensure safety of the communication path.

Figure 29:
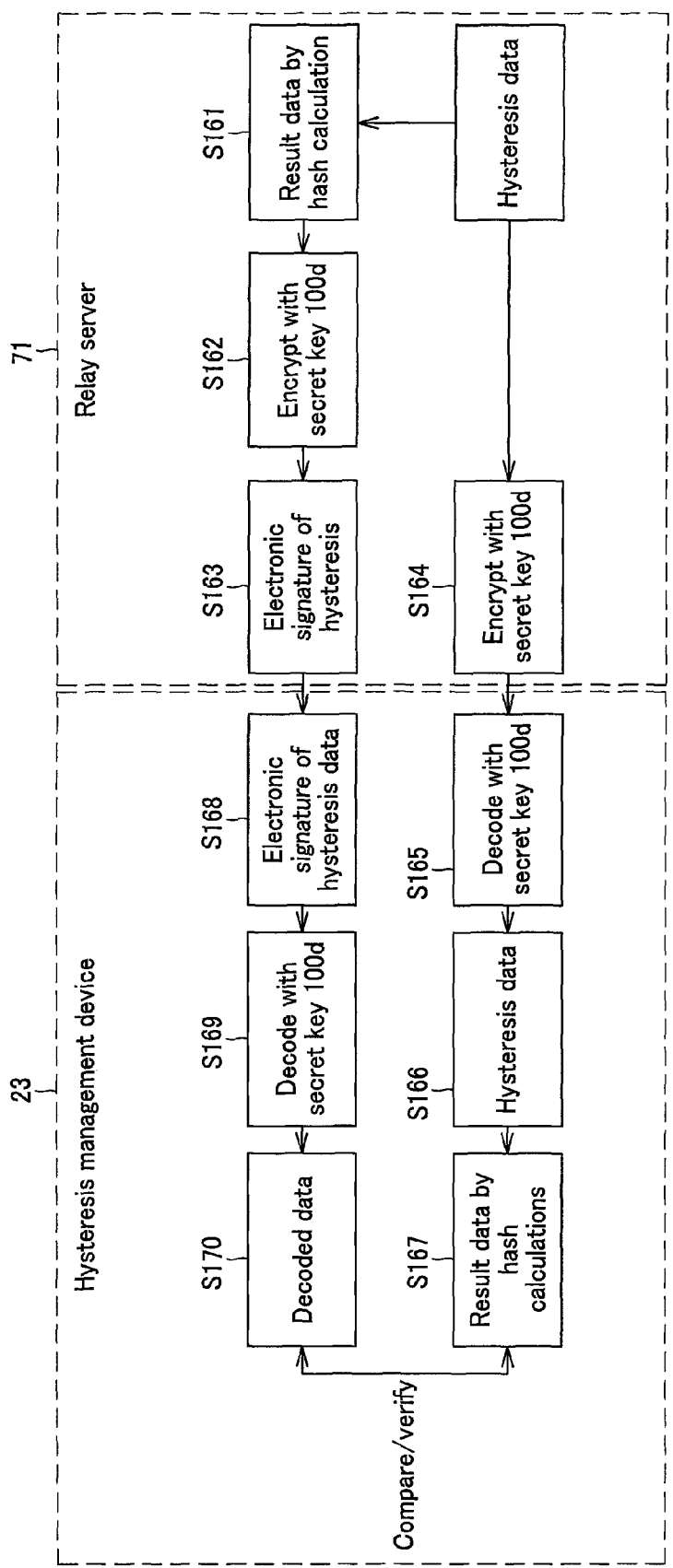
FIG. 29 is a block diagram showing the SSL between a relay server and a hysteresis management unit.

FIG. 29 shows the processing for transmitting the hysteresis data from the relay server 71 to the hysteresis management device 23 using the SSL.

When hysteresis data is sent from the relay server 71 to the hysteresis management device 23, the result data, obtained on hash calculation on the hysteresis data in a step S161 in the relay server 71 is encrypted in a step S162 with the secret key 100d. The so encrypted hysteresis data is electronically signed in a step S163. The hysteresis data is sent in a step S164, along with the data encrypted with the secret key 100d, to the hysteresis management device 23.

The hysteresis management device 23 in a step S165 decodes the received encrypted hysteresis data with the secret key 100d to generate hysteresis data in a step S166. In the next step S167, hash calculation is conducted on the data to generate result data. The hysteresis management device 23 in a step S169 decodes, with the secret key 100d, the electronically signed hysteresis data, received in a step S168 from the relay server 71, to generate decoded data in a step S170. The result data of the hash calculation, obtained in the step S164, should be coincident with the decoded data of the step S170 except if substitution or garbage has occurred in the course of the communication. These may be compared/verified to ensure safety of the communication path.

Figure 30:
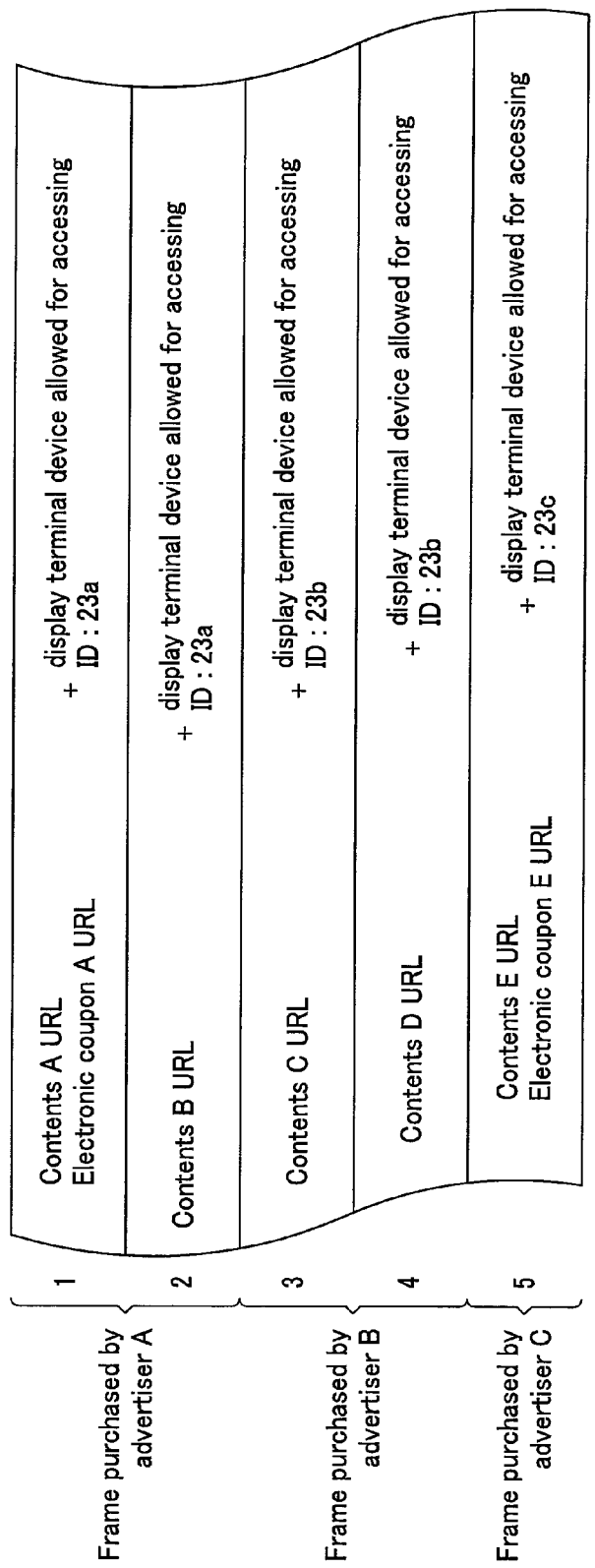
FIG. 30 is a schematic view showing a reproduced list.

Meanwhile, what is sold by the system manager S of the system shown in FIGS. 1 and 18 to the advertisers A to C is specifically the advertisement time frames. This point is explained with reference to FIG. 30. In each place LS, S or CS, where there is installed the display terminal device 32, shown in FIG. 18, there is the reproduction list of the advertisement data shown in FIG. 30. In this figure, the first and second frames are purchased by the advertiser A, the third and fourth frames are purchased by the advertiser B and the fifth frame is purchased by the advertiser C. That is, the advertisers purchase a pre-defined advertisement frame of the display terminal device 32 in which to display advertisement data. This reproduction list differs from one place of installation LS, S or CS of the display terminal device 32 to another.

Hence, confidentiality must be kept among the advertisers until distribution of advertisement data, whilst each advertiser must be able to change own advertisement frames freely. On the other hand, the system manager S must grasp the entire system and must access to all advertisement frames within the necessary extent. In this manner, with the present system, the right of each advertiser to edit and browse is set depending on the character of each terminal to allow the advertisement frames to be supervised by each advertiser as confidentiality is maintained.

In FIG. 31, ○ denotes that there is the right to access all data in the system, Δ denotes that there is right to access only data allowed to access and x denotes that there is no right to have access.

For example, the system management terminal device 62, shown in FIG. 18, is acted upon by the system manager S and manages the entire system. The editing device 21 is also managed by the system manager S to generate the advertisement data or the reproduction schedule. Hence, as shown in FIG. 31, when the system manager has logged in, the system management terminal device 62 and the editing device 21 have the right to access as to editing of the reproduction schedule, registration of the advertisement data, pre-browsing of advertisement data, browsing of hysteresis data or coupon circulation hysteresis.

FIG. 32 shows data that may be accessed when the system manager has logged in at the system management terminal device 62 or the editing device 21. It is here possible to edit files or text files of advertisement data. In a frame of 14:15:30-14:30:30, which is a vacant frame, new advertisement data can be entered.

In case of login by the advertisement data/reproduction list approver, the system management terminal device 62 or the editing device 21 has the right to access only in connection with editing of a reproduction schedule or pre-browsing of hysteresis data.

The advertisers A to C need to access own advertisement data, however, they should be unable to access other than the own advertisement data. Hence, the first to third advertisement input units 10a to 10c of the advertisers have the right to access own advertisement data in connection with editing of the reproduction schedule, registration or pre-browsing of the advertisement data, browsing of hysteresis data or coupon circulation hysteresis. FIG. 33 specifically shows data that may be accessed by the first to third advertisement input units 10a to 10c. It may be seen from comparison with FIG. 32 that only own frames of advertisement frames can be accessed.

It is also necessary for a management terminal device 81 of each place LS, S and CS of the display terminal devices 32 to manage these display terminal devices 32. So, the management terminal device 81 has the right to access own advertisement data in connection with editing of the reproduction schedule, registration of the advertisement data, pre-browsing of advertisement data, browsing of hysteresis data, coupon circulation hysteresis or power supply management of the display terminal devices 32 insofar as own advertisement data are concerned.

Thus, when various advertisement data, such as advertisement data, reproduction schedule, coupon data, utensil setting information or the hysteresis information, retained by the system, are edited or managed by plural management terminals, it becomes possible to maintain confidentiality by setting the advertisement time frames that may be edited or browsed from one management terminal manager to another. It is also possible for plural managers to manage advertisement frames on which they have different rights.

The invention claimed is:

1. A data processing system comprising:
editing means for editing a plurality of advertisement data to generate edited advertisement data for distribution;
distribution means for distributing the edited advertisement data edited by said editing means over a network;
display means for displaying the distributed edited advertisement data in a first place; said display means including first readout/write means for reading out from and writing in a memory having at least memory identification data stored therein;
second readout/write means installed in a second place different from said first place to read out from and write in said memory;
management means for managing hysteresis data from said first readout/write means, correlated with said memory identification data, and hysteresis data from said second readout/write means, correlated with said memory identification data; and
analysis means for correlating, for each of said memory identification data, said hysteresis data from said first readout/write means and said hysteresis data from said second readout/write means, and for generating analysis data, wherein
said memory has further stored therein owner identification data correlated with said memory identification data,
said analysis means correlates said owner identification data with said memory identification data,
at least one of said advertisement data is advertisement data of a predetermined territory including said first place,
said editing means generates edited advertisement data in association with place identification data identifying said first place,
said display means is correlated with said place identification data identifying said first place,
said distributing means distributes said edited advertisement data to said display means correlated with said place identification data coincident with said place identification data of said edited advertisement data,
said at least one advertisement data includes coupon data,
when advertisement data of said predetermined territory is accessed on said display means and a request is made for acquisition of said coupon data, said first readout/write means writes said coupon data in said memory, and
said memory storing said coupon data is a detachable memory IC card.

2. The data processing system according to claim 1, wherein
said memory has stored therein value data correlated with said memory identification data;
said value data is managed by memory management means managing the storage contents of said memory;
said at least one memory includes coupon data;
said first readout/write means when advertisement data of said preset territory is accessed on said display means and a request for acquisition of said coupon data is made transmits to said memory management means data of said request for acquisition of said coupon data as said request data is correlated with said memory identification data;
said memory management means manages the data of said request for acquisition of said coupon data in association with said memory identification data; and wherein
when said data of said request for acquisition of said coupon data, correlated with read-out memory identification data of said memory, is in said memory management means, said second readout/write means updates the value data stored in said memory depending on the contents of said coupon data.

3. A data processing method comprising steps of:
editing a plurality of advertisement data to generate edited advertisement data for distribution by editing means;
distributing the advertisement data edited by said editing means by distributing means over a network;
displaying the distributed edited advertisement data by display means installed in a first place;

reading out edited advertisement data stored in a memory by first readout/write means installed in said display means;

reading out memory identification data stored in said memory, by second readout/write means installed in a second place different from said first place;

managing hysteresis data from said first readout/write means, correlated with said memory identification data, and hysteresis data from said second readout/write means, correlated with said memory identification data, by management means; and correlating, for each of said memory identification data, said hysteresis data from said first readout/write means and said hysteresis data from said second readout/write means, and for generating analysis data, by analysis means, wherein said memory has further stored therein owner identification data correlated with said memory identification data, said analysis means correlates said owner identification data with said memory identification data, at least one of said advertisement data is advertisement data of a predetermined territory including said first place, said editing means generates edited advertisement data in association with place identification data identifying said first place, said display means is correlated with place identification data identifying said first place, said distributing means distributes said edited advertisement data to said display means correlated with said place identification data coincident with place identification data of said edited advertisement data, said at least one advertisement data includes coupon data, when advertisement data of said predetermined territory is accessed on said display means and a request is made for acquisition of said coupon data, said first readout/write means writes said coupon data in said memory, and said memory storing said coupon data is a detachable memory IC card.

* * * * *